(12) United States Patent
Wei et al.

(10) Patent No.: US 8,804,617 B2
(45) Date of Patent: Aug. 12, 2014

(54) WIRELESS TRANSMISSION METHOD, BASE STATION, RELAY STATION AND MOBILE STATION USING THE SAME

(75) Inventors: Hung-Yu Wei, Taipei (TW); Ching-Chun Chou, Taipei (TW)

(73) Assignees: Industrial Technology Research Institute, Hsinchu (TW); National Taiwan University, Taipei (TW)

( * ) Notice: Subject to any disclaimer, the term of this patent is extended or adjusted under 35 U.S.C. 154(b) by 445 days.

(21) Appl. No.: 12/973,917

(22) Filed: Dec. 21, 2010

(65) Prior Publication Data

US 2012/0155361 A1    Jun. 21, 2012

(51) Int. Cl.
*H04W 4/00* (2009.01)
*H04W 88/04* (2009.01)

(52) U.S. Cl.
CPC ..................................... *H04W 88/04* (2013.01)
USPC ........................................ 370/328; 370/338

(58) Field of Classification Search
CPC ... H04W 4/06; H04W 72/005; H04W 88/085; H04W 88/04; H04W 76/002; H04W 72/042
USPC ......... 370/316, 338, 312, 315, 328; 455/13.1, 455/15, 16
See application file for complete search history.

(56) References Cited

U.S. PATENT DOCUMENTS 7,457,288 B2  11/2008  Park et al.
7,590,064 B1   9/2009  Zhang et al.
(Continued)

FOREIGN PATENT DOCUMENTS

| CN | 101355497 A | 1/2009 |
|---|---|---|
| CN | 101843165 A | 9/2010 |
| TW | 200814629 | 3/2008 |
| WO | 2008115289 A2 | 9/2008 |

OTHER PUBLICATIONS

Yao Zhao et al, "On-Demand Multicast Routing Protocol with Multihop Relay (ODMRP-MPR) in Mobile Ad-Hoc Network," Proceedings of ICCT 2003, p. 1295-p. 1300.

(Continued)

*Primary Examiner* — Ricky Ngo
*Assistant Examiner* — Kabir Jahangir
(74) *Attorney, Agent, or Firm* — Jianq Chyun IP Office

(57) ABSTRACT

A wireless transmission method, a base station, a relay station, and a mobile station using the same methods are proposed. The method is adapted for delivering MBS in a relay system, and includes following procedures. MBS data is transmitted by a base station at a first time point to at least a subordinate mobile station. The MBS data is also transmitted at the first time point or at a later time point from the base station to subordinate relay node(s) thereof. The base station and relay node(s) at an upper hop level decide whether to transmit a duplicate of the MBS data simultaneously with the relay node(s) at a lower hop level when the lower hop level relay node(s) is scheduled to transmit the received MBS data at the later time point. An indicator is used to indicate any two transmissions being identical.

26 Claims, 18 Drawing Sheets

20

(56) References Cited

U.S. PATENT DOCUMENTS

| | | | |
|---|---|---|---|
| 2007/0245204 A1 | 10/2007 | Yomo et al. | |
| 2008/0025240 A1* | 1/2008 | Casaccia et al. | 370/312 |
| 2008/0165699 A1 | 7/2008 | Wei | |
| 2008/0247372 A1* | 10/2008 | Chion et al. | 370/338 |
| 2009/0005104 A1* | 1/2009 | Wang et al. | 455/522 |
| 2009/0016256 A1* | 1/2009 | Kim et al. | 370/315 |
| 2009/0109952 A1* | 4/2009 | Lakkis | 370/349 |
| 2009/0111376 A1* | 4/2009 | Kim et al. | 455/9 |
| 2009/0185492 A1* | 7/2009 | Senarath et al. | 370/238 |
| 2010/0135261 A1* | 6/2010 | Mosko et al. | 370/337 |
| 2010/0142417 A1* | 6/2010 | Kim et al. | 370/281 |
| 2010/0177672 A1* | 7/2010 | Dayal et al. | 370/311 |
| 2010/0257423 A1* | 10/2010 | Kim | 714/749 |
| 2010/0303032 A1* | 12/2010 | Seo et al. | 370/329 |
| 2010/0322150 A1* | 12/2010 | Wilcoxson et al. | 370/321 |
| 2011/0176477 A1* | 7/2011 | Lee et al. | 370/315 |
| 2011/0294415 A1* | 12/2011 | Jeon et al. | 455/7 |

OTHER PUBLICATIONS

Shudong Jin et al, "Cache-and-Relay Streaming Media Delivery for Asynchronous Clients," International Workshop on Network Group Communication, 2002, 8 pages.

Y.G. Wang et al, "Inter Node B Synchronization SFN for MBMS Transmission," IEEE 65th Vehicular Technology Conference, 2007, VTC2007—Spring, p. 2996-p. 3000.

Chengxuan He et al, "Performance Evaluation of a WiMAX Multi-hop Relay system to support Multicast/Broadcast Service," IEEE 6h International Conference on Mobile Adhoc and Sensor Systems, 2009, MASS 09', p. 682-p. 687.

Ismail Guvenc et al, "Reliable Multicast and Broadcast Services in Relay-based Emergency Communications," IEEE Wireless Communications, Jun. 2008, p. 40-p. 47.

"First Office Action of China Counterpart Application", issued on Dec. 30, 2013, p. 1-p. 10.

* cited by examiner

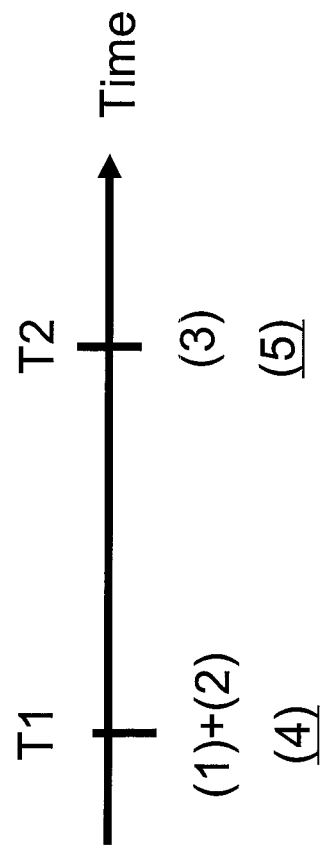
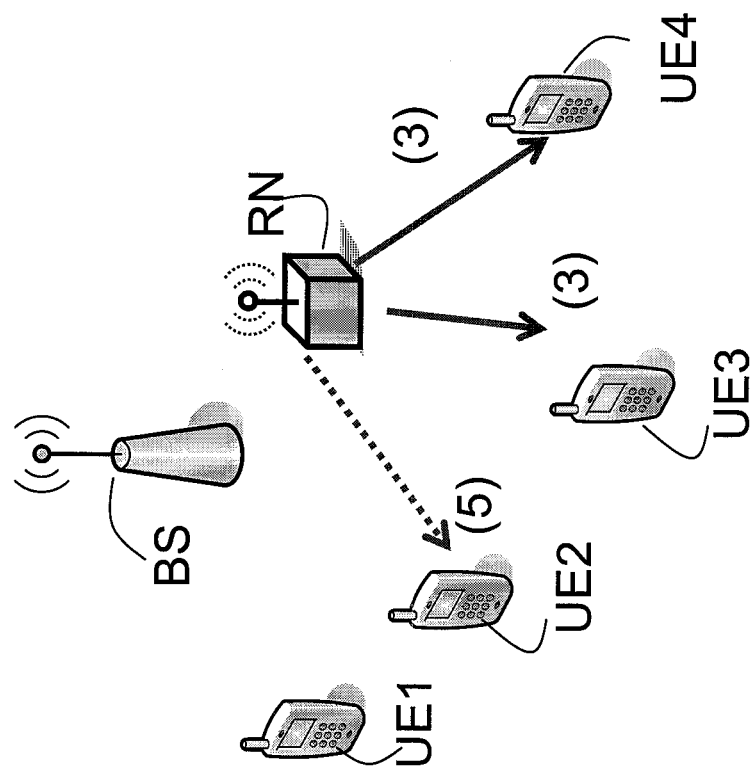
FIG. 4B
FIG. 4A

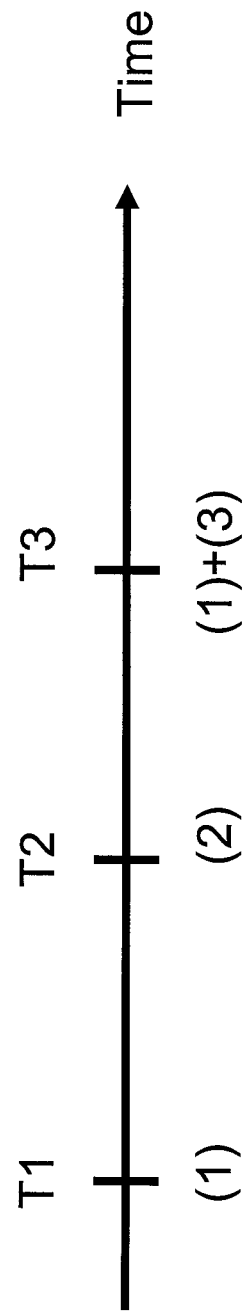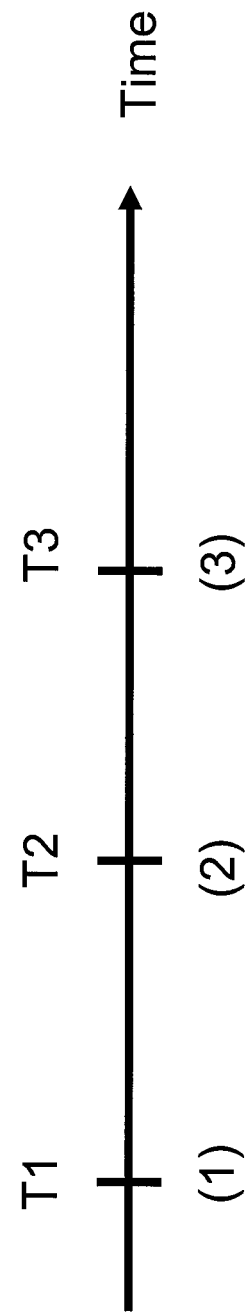

| T1 | T2 | T3 |
|---|---|---|
| 701+702 | 703+704 | 705 |
| 701+702 | 703+704 | 701+705 |
| 701+702 | 703+704 | 703+705 |
| 701+702 | 703+704 | 701+703+705 |
| 701+702 | 701+703+704 | 705 |
| 701+702 | 701+703+704 | 701+705 |
| 701+702 | 701+703+704 | 703+705 |
| 701+702 | 701+703+704 | 701+703+705 |

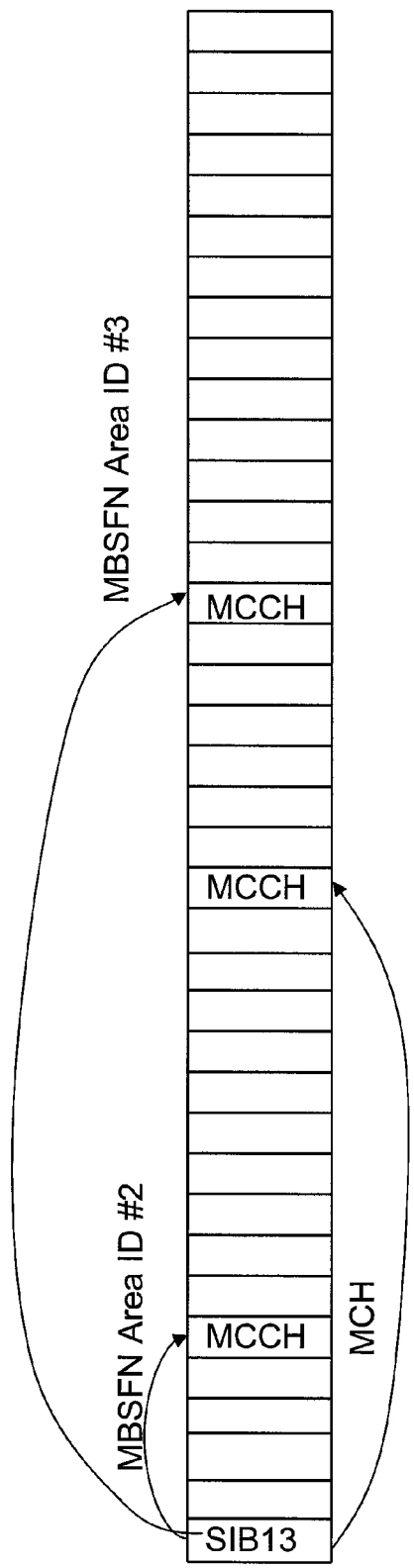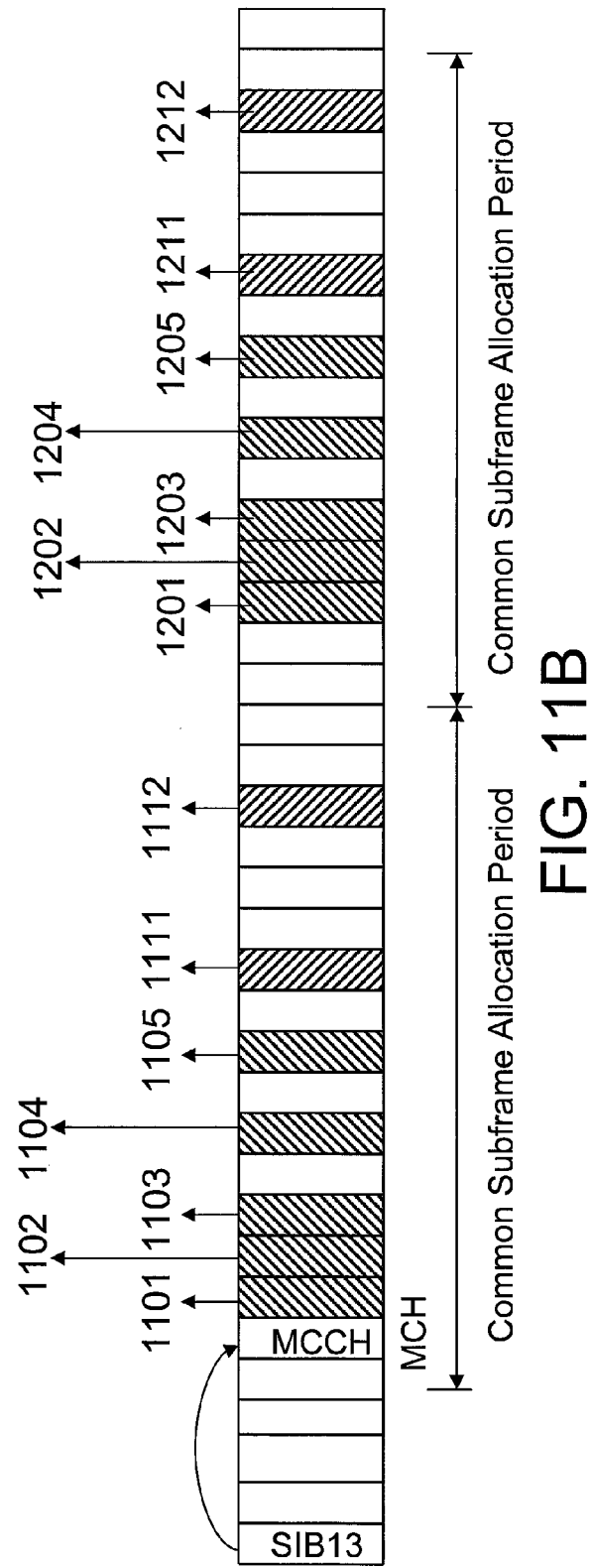
FIG. 11A
FIG. 11B

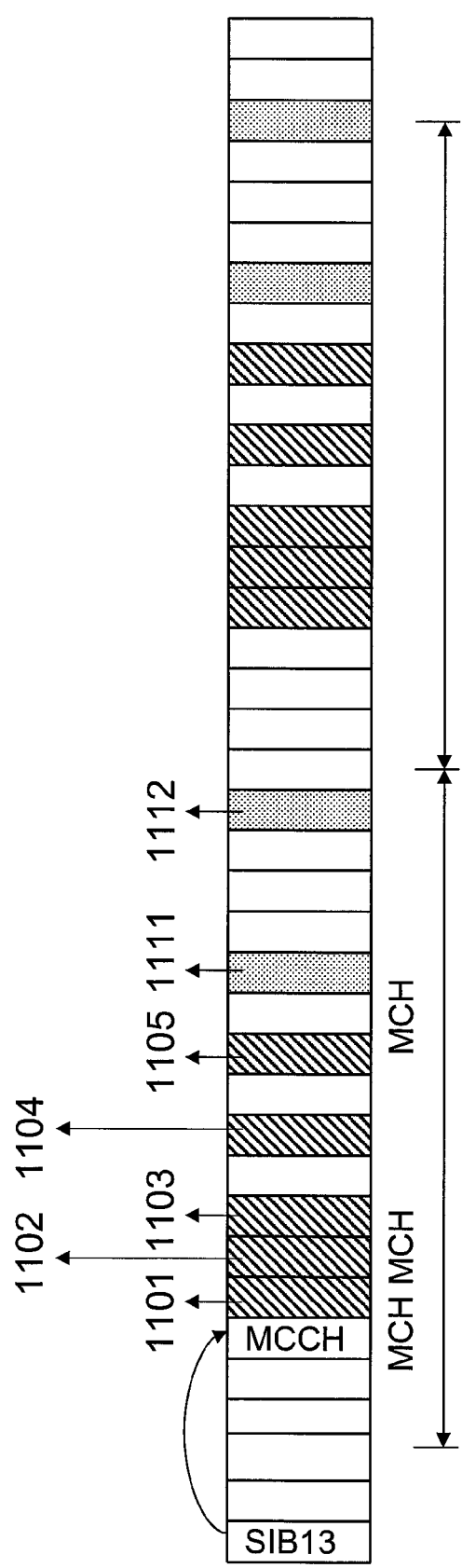
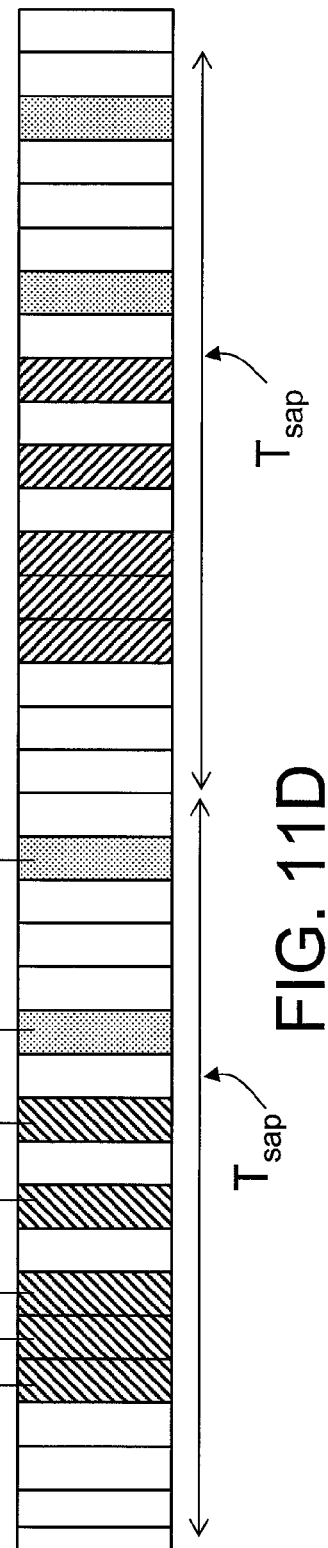
FIG. 11C
FIG. 11D

WIRELESS TRANSMISSION METHOD, BASE STATION, RELAY STATION AND MOBILE STATION USING THE SAME

TECHNICAL FIELD

The disclosure generally relates to a wireless transmission method for delivering multicast broadcast service under a relay structure, and a base station, a relay station and a mobile station using the same method.

BACKGROUND

Multicast Broadcast Service (MBS) is a popular method for wireless multimedia transmissions. The characteristic of MBS in delivering multimedia contents from a point to multi-point efficiently utilizes scarce radio resource for the wireless spectrum. Thus, MBS is widely used in the multimedia transmissions, due to the aforementioned characteristics.

On the other hand, relay is a developing technology in current wireless communication systems. By introducing intermediate relay nodes (RN) into a wireless communication system, the system capacity can be increased, the radio coverage can be enlarged, and the received signal strength can be improved. Consequently, IEEE 802.16m standard and Third Generation Partnership Project Long Term Evolution Advanced (3GPP LTE-Advanced) wireless standards adopt relay techniques.

FIG. 1 illustrates a conventional transmission scheme of a MBS system 10 with a relay node. FIG. 1 shows the basic system structure of the MBS system 10 with 2-hop relay. This conventional transmission scheme is specified by, for example, IEEE 802.16j standard. Referring to FIG. 1, the MBS system 10 includes at least a base station BS, at least a relay node RN, and several mobile stations UE1, UE2, UE3 and UE4. Between the base station BS and the base stations UE1, UE2 under the coverage of the base station BS, there is link (1). It is assumed that just broadcast or multicast delivered by the base station BS and the relay node RN, so the link with the same notation refers to the same physical signaling broadcast by the base station BW or the relay node RN. Between the base station BS and the relay node RN, there is link (2). Between the relay node RN and the base stations UE3, UE4 under the coverage of the relay node RN, there is link (3).

In IEEE 802.16j standard, link (2) is first transmitted, and then link (1) and link (3) are transmitted. The base station BS first organizes the relay nodes as a relay group, and then multicasts data to all relay nodes. After the multicast transmission of the base station BS, the base station BS and relay nodes serve the subordinate mobile stations (or user equipments) synchronously.

In the aforementioned MBS transmission scheme with the relay node, the mobile stations are served just by either the base station BS or relay nodes. In other words, the mobile stations are not simultaneously receiving data from both the base station BS and the relay nodes. If MBS is delivered in the aforementioned transmission scheme with the relay node, the transmission is inefficient as a result of the multi-hop transmission of the relay structure. Therefore, it is a major concern to modify existing MBS protocols so as to make delivery of MBS over the relay network more efficient and more reliable.

SUMMARY

A wireless transmission method is introduced herein. According to an exemplary embodiment, the wireless transmission method is adapted for delivering MBS in a relay system. MBS data is transmitted at a base station to at least a subordinate mobile station of the base station at a first time point. The MBS data is transmitted at the base station to at least a subordinate relay node of the base station at the first time point or at a second time point, where the second time point is later than the first time point. The base station and the at least a relay node at an upper hop level decide whether to transmit a duplicate of the MBS data simultaneously with at least a relay node at a lower hop level when the at least a relay node at the lower hop level is scheduled to transmit the received MBS data at a time point later than the first time point. In addition, an indicator is used to indicate any two transmissions being identical.

A base station is introduced herein. According to an exemplary embodiment, the base station is adapted for delivering multicast broadcast service (MBS) in a relay system. The base station is configured for transmitting MBS data to at least a subordinate mobile station of the base station at a first time point. The base station is configured for transmitting the MBS data to at least a subordinate relay node of the base station at the first time point or at a second time point, which is later than the first time point. The base station is configured for deciding whether to transmit a duplicate of the MBS data simultaneously with at least a relay node at a lower hop level when the at least a relay node at the lower hop level is scheduled to transmit the received MBS data at a time point later than the first time point. In addition, the base station is configured for using an indicator to indicate any two transmissions being identical.

A relay station is introduced herein. According to an exemplary embodiment, the relay station is adapted for delivering multicast broadcast service (MBS) in a relay system. The relay station is configured for receiving MBS data from a base station or a relay station at an upper hop level in the relay system. The relay station is configured for transmitting the received MBS data, at a first time point, to at least a mobile station or at least a subordinate relay station thereof in the relay system. The relay station is configured for deciding whether to transmit a duplicate of the received MBS data simultaneously with at least a relay node at a lower hop level when the at least a relay node at the lower hop level is scheduled to transmit the received MBS data. In addition, the relay station is configured for using an indicator to indicate any two transmissions being identical.

A mobile station is introduced herein. According to an exemplary embodiment, the mobile station is adapted for receiving MBS in a relay system. The mobile station is configured for overhearing MBS transmission from a base station or at least a relay node in the relay system, which do not have direct control over the mobile station. The mobile station is configured for receiving the MBS data or the duplicate of the MBS data, or both the MBS data and the duplicate thereof. The mobile station is configured for checking an indicator in the MBS data in order to determine whether the MBS data is original or duplicate. In addition, the mobile station decides whether to abort receiving the MBS data when the MBS data is determined as being duplicate according to the indicator.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 4A a schematic diagram illustrating a second phase operation of a MBS system according to a second exemplary embodiment.

FIG. 4B is a schematic diagram illustrating a timing sequence of a MBS operation according to a second exemplary embodiment.

FIG. 6A is schematic diagram illustrating a timing sequence of a MBS operation according to a third exemplary embodiment.

FIG. 6B is schematic diagram illustrating a timing sequence of a MBS operation according to a fourth exemplary embodiment.

FIG. 7B is a table illustrating possible timing sequences of multi-hop MBS operations according to a fifth exemplary embodiment.

FIG. 11A-FIG. 11C are schematic diagrams illustrating relationship between SIB13, MCCH, and MCH.

FIG. 11D is a schematic diagram illustrating subframe allocation for two phases of MBMS data transmission.

DESCRIPTION OF THE EXEMPLARY EMBODIMENTS

Figure 2:
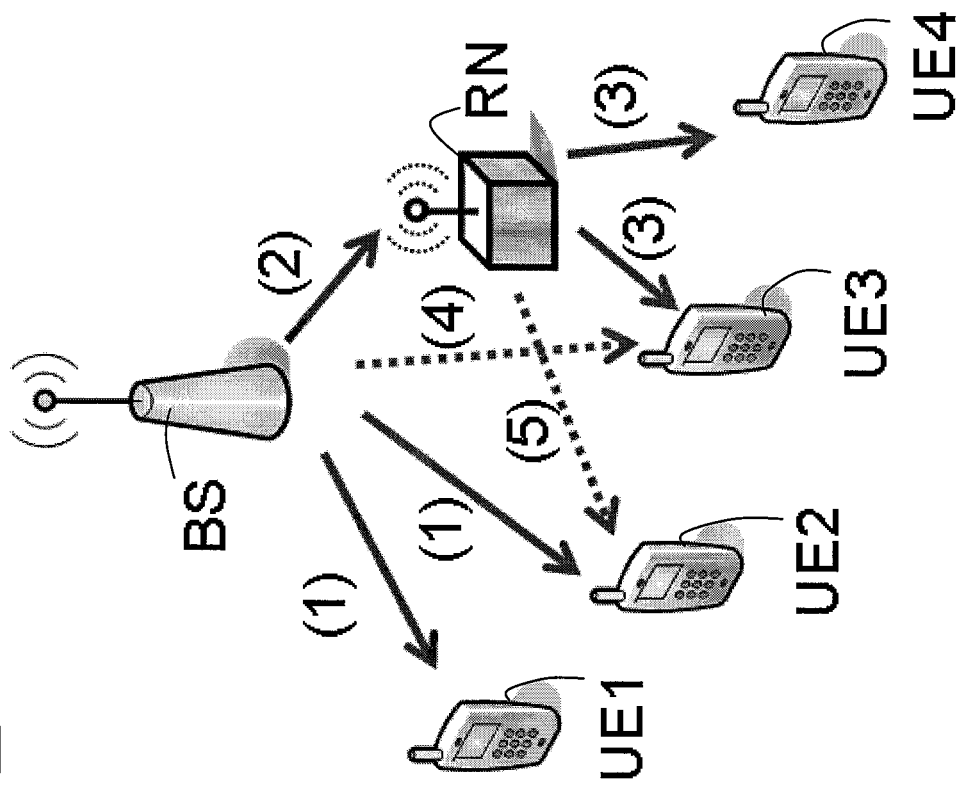
FIG. 2 is a schematic diagram illustrating a MBS system according to an exemplary embodiment.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 1:
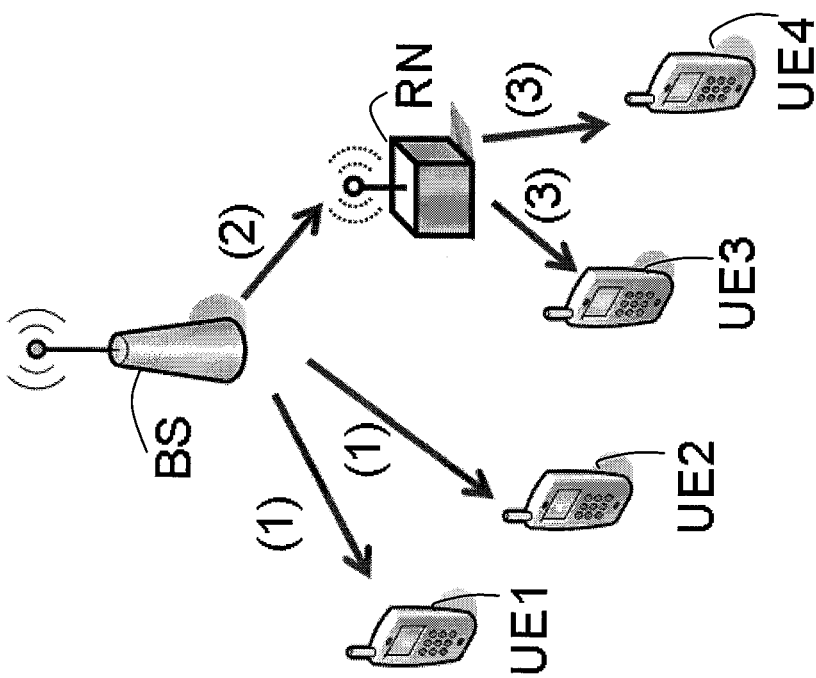
FIG. 1 illustrates a conventional transmission scheme of a MBS system with a relay node.

In the present disclosure, there is proposed an efficient transmission scheme for MBS under the relay structure. By introducing relay nodes into the MBS system such as the MBS system 10 shown in FIG. 1, the MBS is required to be delivered through multi-hop transmission from the base station BS through the relay node RN to the mobile stations or user equipments (UE). Moreover, by treating the relay nodes in the MBS system as a UE, the base station BS may distribute the data to the relay nodes and UEs at the same time, without the overhead of separate transmissions to each one of the relay nodes. Furthermore, the idea of ALIAS is introduced into the MBS system to enhance MBS data reliability. Identical MBS data delivered in different transmissions are marked with the same ALIAS, allowing the UEs to overhear or receive the MBS data for multiple times. The efficient transmission scheme for MBS under the relay structure can be easily implemented in existing MBS system without extra resources and with little signaling cost.

With the multi-hop characteristics of the relay system, the MBS data may be distributed to the relay node prior to the relay nodes' or the base stations' transmission to the UE. Throughout the disclosure, the user equipment (UE) can refer to mobile station, advanced mobile stations, wireless terminal communication device, etc. The UE can be, for example, a digital television, a digital set-top box, a personal computer, a notebook PC, a tablet PC, a netbook PC, a mobile phone, a smart phone, etc. Also, the base station can refer to advance base station, node B, enhanced node B, etc. The relay node can refer to relay station.

In the present disclosure, multicast synchronization problem for the single frequency network (SFN) is also considered. Overhearing is not allowed in the conventional relay network. Such limitation reduces data reliability in delivering MBS over the relay network. For example, the mobile station UE2 in FIG. 1 may overhear the transmission from the relay node RN and obtain higher data reliability. Moreover, while the base station BS transmits to the relay node RN, it is possible that some of the mobile stations under the coverage of the base station BS may overhear the BS transmission. If the MBS transmission is properly configured, such overhearing opportunities may be deemed as redundancies, which may be beneficial for enhancing the system reliability of delivering MBS over the relay network. However, such kind of transmission is not investigated in the conventional MBS systems.

In order to present the details of the disclosure, a simplest MBS system with 2-hop relay is considered first. FIG. 2 is a schematic diagram illustrating a MBS system 20 according to an exemplary embodiment. FIG. 2 is similar to FIG. 1 except that the mobile stations of the MBS system 20 may decide to overhear signal transmissions from either the base station BS or the relay node RN. Referring to FIG. 2, originally, the mobile station UE1, UE2 are under direct control of the base station BS. The mobile stations UE3, UE4 are directly controlled by the relay node RN. There are generally five kinds of links which can be identified in FIG. 2. The link (1) refers to the MBS data transmission from the base station BS to its subordinate mobile stations UE1 and UE2. The link (2) refers to the MBS data transmission from the base station BS to the relay node RN. The link (3) refers to the transmission from the relay node RN to the mobile stations UE3 and UE4.

In the present exemplary embodiment, links (4), (5) are enabled using overhearing, which means that the mobile stations may attempt to hear the transmission from other sources, under which the mobile stations are not directly controlled. The link (4) refers to the transmission from the base station BS to mobile station UE3, where the mobile station UE3 is directly controlled by the relay node RN rather than the base station BS. The link (5) refers to the transmission from the relay node RN to mobile station UE2, where the mobile station UE2 is under a direct control of the base station BS. Since this is MBS transmission, the data transmitted over these links should be the same. Therefore, the overhearing of the mobile stations in the MBS system 20 is possible.

In addition to overhearing, it is worth noticing that link (2) is always to be transmitted prior to the link (3). This is because the relay node RN receives the data from the BS using air interface. If the base station BS does not send the data to the relay node RN using the link (2), then the relay node RN never have the MBS data for transmission to its subordinate relay node or the mobile stations under its direct control.

Figure 3B:
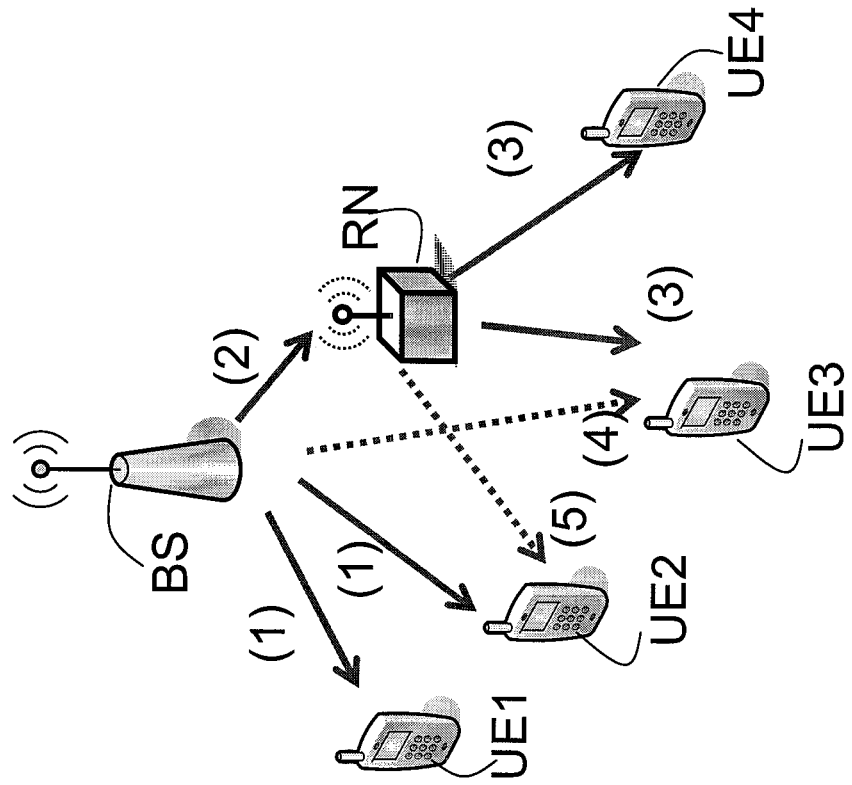
FIG. 3B is a schematic diagram illustrating a second phase operation of a MBS system according to a first exemplary embodiment.
Figure 3A:
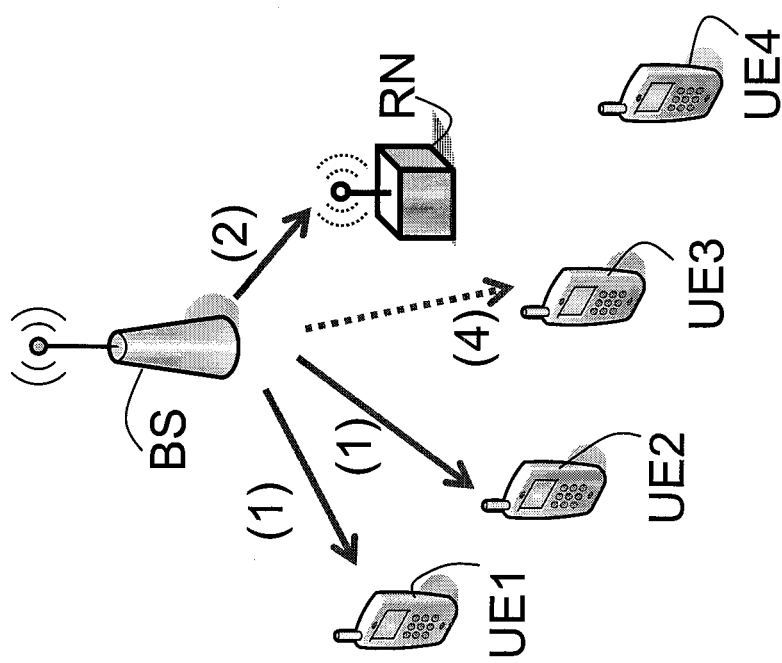
FIG. 3A is a schematic diagram illustrating a first phase operation of a MBS system according to a first exemplary embodiment.
Figure 3C:
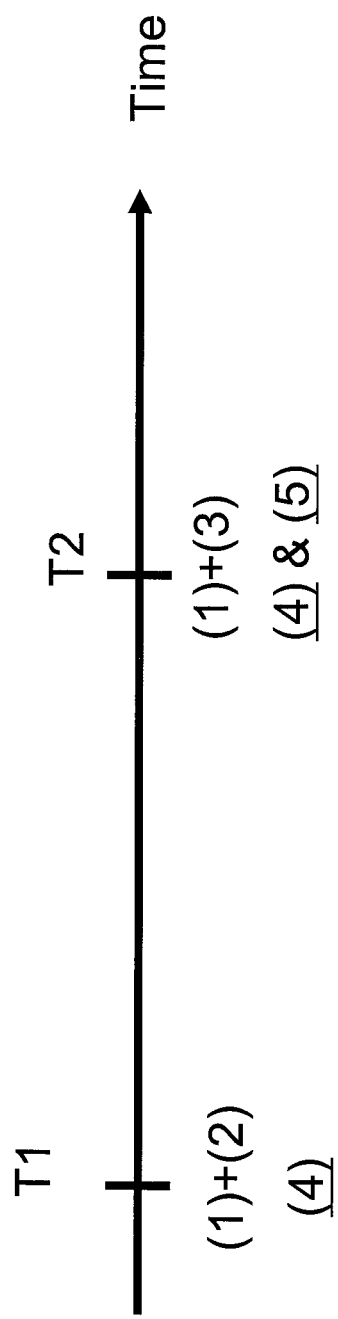
FIG. 3C is a schematic diagram illustrating a timing sequence of a MBS operation according to a first exemplary embodiment.

FIG. 3A is a schematic diagram illustrating a first phase operation of a MBS system according to a first exemplary embodiment. FIG. 3B is a schematic diagram illustrating a second phase operation of a MBS system according to a first exemplary embodiment. FIG. 3C is a schematic diagram illustrating a timing sequence of a MBS operation according to a first exemplary embodiment.

In the first exemplary embodiment scheme, the base station BS serves its subordinate mobile stations (such as the mobile stations UE1, UE2), and the relay node(s) within its coverage first. Then, the relay nodes serve their mobile stations (such as the mobile station) along with the base stations BS serving its own UEs synchronously. The concept of the "promiscuous pre-transmission" helps reduce the number of MBS transmissions.

Referring to FIG. 3A, the base station BS first transmits the MBS data to its subordinate mobile stations, which are the mobile stations UE1 and UE2, and the relay node RN. In the present exemplary embodiment, the link (1) and the link (2) are served simultaneously. Since the MBS data from the base station BS to the relay node RN and the MBS data from the base station BS to the mobile stations are identical, the base station BS may multicast or broadcast the data to the relay nodes and its subordinate mobile stations simultaneously. This can be achieved by a promiscuous mode of the mobile stations under the direct control of the base station BS or the relay node RN. The promiscuous mode of the mobile stations refers to the mobile stations sniffing the data transmission from the base station BS to the relay node RNs, or vice versa.

Referring to FIG. 3A, FIG. 3A illustrates the first phase transmission of the MBS system 20. The first phase operation includes the link (1), the link (2) and the link (4). In other words, the base station BS transmits to the relay node RN and its subordinate mobile stations simultaneously in the first phase transmission, and then the base station BS and the relay node RN transmit to their mobile stations synchronously.

Referring to FIG. 3B, FIG. 3B illustrates the second phase transmission of the MBS system 20. After the first phase transmission, the relay node RN receives the MBS data. Then, the relay node RN can serve its subordinate mobile stations, which are the mobile stations UE3 & UE4. At the same time, the base station BS serves its own mobile stations UE1 and UE2 again. That is, the link (1) and the link (3) are served simultaneously in the second phase transmission. Such transmission is achieved by the technique of single frequency network (SFN).

Referring FIG. 3C, FIG. 3C illustrates a timing sequence of the MBS transmissions summarized from FIG. 3A and FIG. 3B. The horizontal axis of the timing sequence line in FIG. 3C is in time domain, where the time points T1, T2 respectively refer to the first phase transmission and the second phase transmission in the first exemplary embodiment. At the time point T1, the link (1) and the link (2) are first transmitted, where the underscored link (4) is enabled if overhearing is allowed. At the time point T2, the link (1) and the link (3) are transmitted in the second phase transmission, where the underscored link (5) is enabled if overhearing is allowed.

As the MBS data packets are identical over these links (1), (2), (3), the physical signals over the radio interface are also identical for the links (1), (2), (3). Therefore, the base station BS can transmit the same radio signals over the radio interface to its subordinate mobile stations, enabling the mobile stations UE1 and UE2 to receive the MBS data for the second time. This redundancy transmission enhances the data reliability. On the other hand, macro diversity is also achieved by overhearing on the links (4) and (5) if overhearing is allowed. The first exemplary embodiment can be applied to both a transparent-mode MBS system and a non-transparent-mode MBS system. From another perspective, the exemplary embodiments of the present disclosure can all be applied to a Type I relay station and a Type II relay station defined in LTE system.

FIG. 4A is a schematic diagram illustrating a second phase operation of a MBS system according to a second exemplary embodiment. FIG. 4B is a schematic diagram illustrating a timing sequence of a MBS operation according to a second exemplary embodiment. In the second exemplary embodiment, the base station BS serves its subordinate mobile stations and the relay node RN first. The first phase transmission of the second exemplary embodiment is identical to that in the first exemplary embodiment. FIG. 4A illustrates the second phase transmission of the second exemplary embodiment. Referring to FIG. 4A, after the first phase transmission, the relay node RN sends the received MBS data in the second phase transmission to its subordinate mobile station, which are the mobile stations UE3, UE4. In the second phase transmission, the base station BS and the relay nodes at an upper hop level decide not to transmit the MBS data.

Referring to FIG. 4B, in the second exemplary embodiment, the order (or the timing sequence) of the link transmission is that at the time point T1, the links (1), (2) are transmitted, and then the link (3) is transmitted at the time point T2, while in the first exemplary embodiment, the links (1), (3) are transmitted synchronously at the time point 2. FIG. 4B also shows the underscored link (5) is enabled if overhearing is allowed at the time point T2. Macro diversity is also achieved by the link (5) in the second exemplary embodiment.

In order to achieve the aforementioned wireless transmission methods for delivering MBS under the relay structure as mentioned above, proper signaling is required to be configured in the MBS system in order to notify the mobile stations of the redundancy transmission or the second phase transmission. The idea of "ALIAS" is proposed in the present disclosure to capture the redundancy or carry the indication of the redundancy. The ALIAS can be, for example, a signaling message, a flag in the packet header, a separate signaling message, a separate signal message, resource configuration, shared wireless radio resources, or any kinds of signaling message, which can indicate "two transmissions at different time are redundancies." In a more generalized method for delivering MBS data under the relay structure, the ALIAS can be used for indicating "two transmissions at different times are identical," or indicating there are two transmission opportunities for the same MBS data.

Figure 5B:
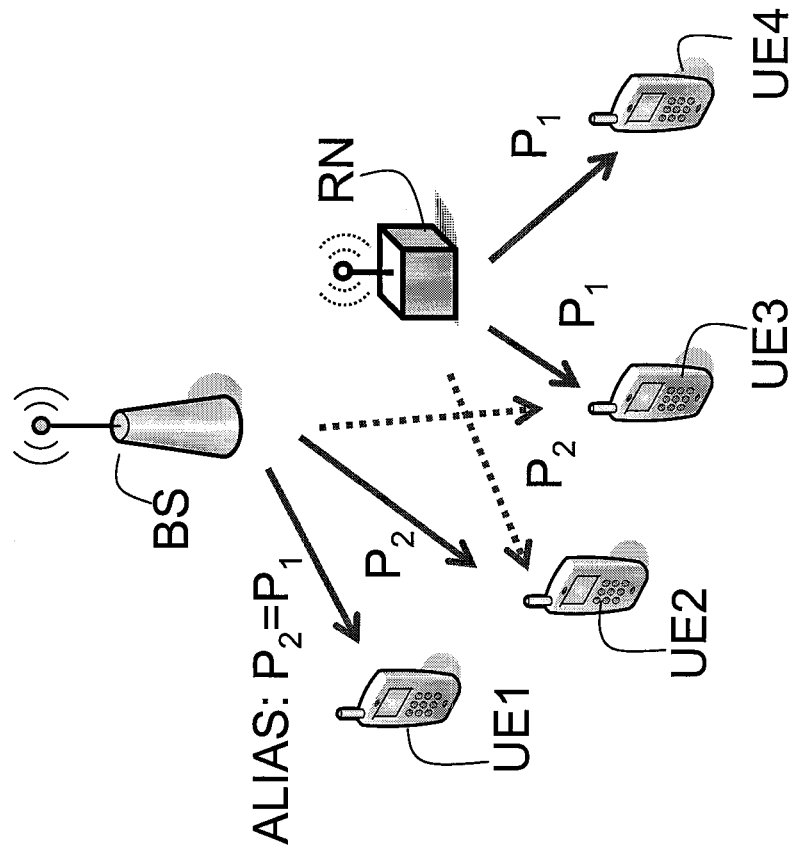
FIG. 5B is a schematic diagram illustrating a second phase operation with ALIAS according to an exemplary embodiment.
Figure 5A:
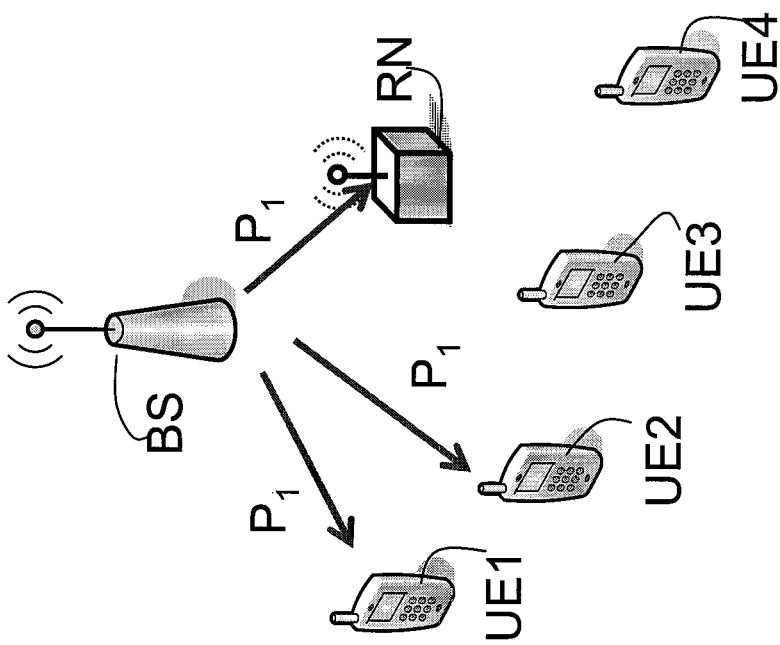
FIG. 5A is a schematic diagram illustrating a first phase operation with ALIAS according to an exemplary embodiment.

FIG. 5A is a schematic diagram illustrating a first phase operation with ALIAS according to an exemplary embodiment. FIG. 5B is a schematic diagram illustrating a second phase operation with ALIAS according to an exemplary embodiment. It is noted that the ALIAS concept can also be applied to the first exemplary embodiment and the second exemplary embodiment.

Take scenarios in FIG. 5A and FIG. 5B as an example, the base station BS transmits the MBS data packet $P_1$ to the relay node RN and its subordinate mobile stations UE1, UE2 in a first transmission phase shown in FIG. 5A. In the second transmission phase shown in FIG. 5B, the base station BS transmits the MBS data packet $P_2$ to the mobile stations UE1, UE2 with an ALIAS indication that "$P_2=P_1$". In other words, the base station BS transmits the MBS data packet $P_1$ for two times to its subordinate mobile stations UE1 and UE2. While the base station BS transmits the MBS data packet $P_2$ to the mobile stations UE1, UE2 in the second phase transmission, the relay node RN transmits the MBS data packet $P_1$ to its subordinate mobile stations UE3 and UE4. Also, the mobile station UE2 may overhear the MBS data packet $P_1$ from the relay node RN on the link (5), and the mobile station UE3 may overhear the MBS data packet $P_2$ from the base station BS on the link (4).

However, as the MBS transmission is on different time slots (or different transmission phase), the mobile stations may not know the contents of $P_1$ and $P_2$ are the same, resulting in separate packet reception and packet treatment. If the ALIAS is provided, the mobile stations UE1 and UE2 can know that "$P_1=P_2$". Therefore, the mobile stations UE1 and UE2 can combine the received signals from the MBS data packet $P_1$, $P_2$, so as to increase the received signal strength. Alternatively, the mobile stations UE1 and UE2 may decide to just receive the MBS data packet $P_1$, to just receive the MBS data packet $P_2$, or to receive both of the MBS data packets $P_1$, $P_2$. Such flexibility and data reliability enhancement is enabled by introducing the signal message ALIAS into the MBS system 20 under the relay structure.

By introducing ALIAS into the wireless transmission method of MBS data under the relay structure, the mobile stations UE1 and UE2 can be aware that the data contents of the received MBS data packets $P_1$ and $P_2$ are identical. Also, on the link (4), the mobile station UE3 can be aware that the data contents of the received MBS data packets $P_1$ and $P_2$ are identical. Therefore the data reliability of the MBS system is enhanced. If the mobile station did not receive the first transmission, a second opportunity of reception is provided. If the UE determines to receive both transmission of MBS data packets $P_1$ and $P_2$, the signal strength is increased and the reception status is improved.

The present disclosure is not limited to the first and the second exemplary embodiment. For example, the transmission order of "the link (1)->the link (2)->the link (1)+(3)" and the transmission order of "the link (1)->the link (2)->the link (3)" are also proposed. These two additional transmission methods for delivering the MBS data under the relay structure are just trivial modifications to the previous exemplary embodiments, by dividing the original transmission of the link (1) and (2) in the first transmission phase into two separate transmissions.

FIG. 6A is a schematic diagram illustrating a timing sequence of a MBS operation according to a third exemplary embodiment. FIG. 6B is schematic diagram illustrating a timing sequence of a MBS operation according to a fourth exemplary embodiment. Referring to FIG. 6A, the link (1) is transmitted at the time point T1, the link (2) is transmitted at the time point T2, and the links (1) and (3) are transmitted synchronously at the time point T3. Referring to FIG. 6B, the link (1) is transmitted at the time point T1, the link (2) is transmitted at the time point T2, and the link (3) is transmitted at the time point T3. It is noted that, overhearing and the concept of ALIAS can still be applied to the third and the fourth exemplary embodiment.

Figure 7A:
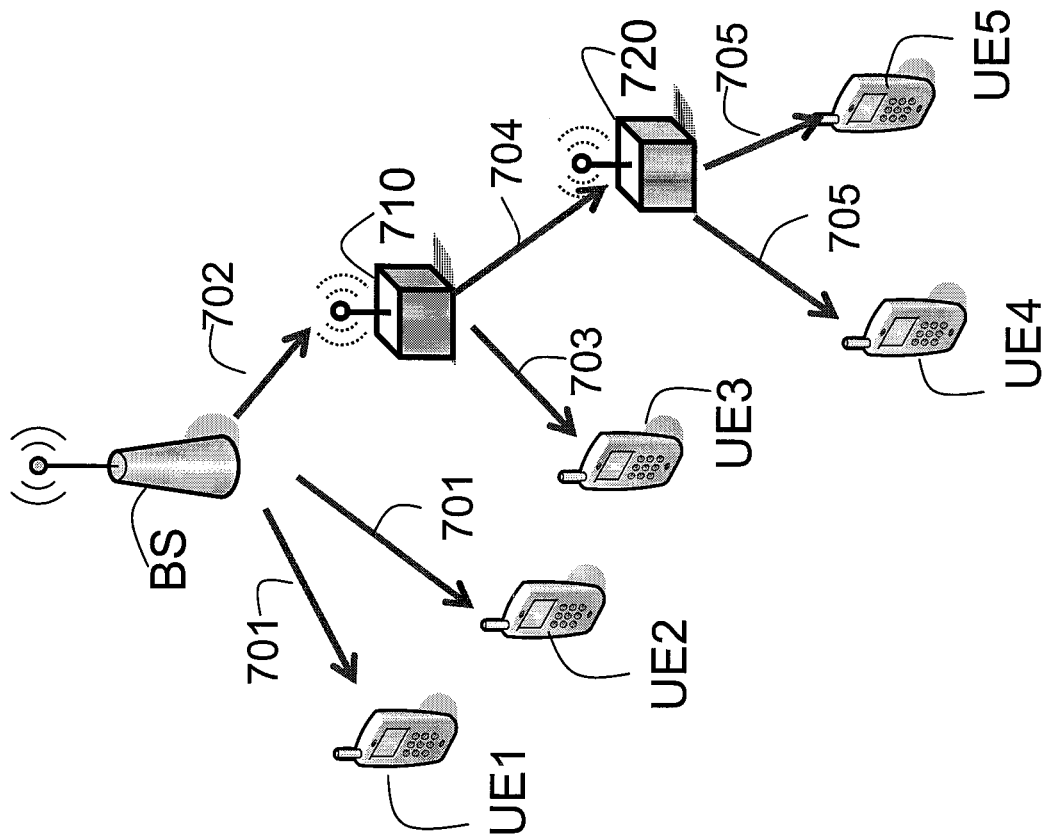
FIG. 7A is a schematic diagram illustrating a multi-hop MBS system according to a fifth exemplary embodiment.

The aforementioned exemplary embodiment can be generalized to include the multi-hop scheme, the redundancy transmission of the base station or upper level relay nodes in the hierarchy is introduced below. FIG. 7A is a schematic diagram illustrating a multi-hop MBS system 70 according to a fifth exemplary embodiment. FIG. 7B is a table illustrating possible timing sequences of multi-hop MBS operations according to a fifth exemplary embodiment. In the fifth exemplary embodiment, for example, FIG. 7A shows the multi-hop MBS system 70 with three hop relay transmissions. 8 possible combinations of the (redundancy) transmission patterns are available. The 8 possible combinations of the transmission patterns are listed in table 75 of FIG. 7B. The more hop level there is in the hierarchy, the more combinations of redundancy transmission patterns there can be. In general, for the number of hops, n, in the multi-hop MBS system, there will be $2^n$ of possible combinations of the transmission patterns.

Referring to FIG. 7A, the multi-hop MBS system 70 includes the base station BS, a relay node 710 at the second hop level, and a relay node 720 at the third hop level. Moreover, the multi-hop MBS system 70 also includes the mobile stations UE1, UE2 under direct control of the base station BS, and includes the mobile station UE3 under direct control of the relay node 710, and includes the mobile stations UE4, UE5 under direct control of the relay node 720.

There are just direct links 701, 702, 703, 704, 705 shown in FIG. 7A. There is no overhearing links shown in FIG. 7A. However, overhearing can still be applied to the multi-hop MBS system 70. The ALIAS can also be applied to the multi-hop MBS system 70. The link 701 refers to the MBS data transmission from the base station BS to its subordinate mobile stations UE1 and UE2. The link 702 refers to the MBS data transmission from the base station BS to the relay node 710. The link 703 refers to the MBS data transmission from the relay node 710 to its subordinate mobile station UE3. The link 703 refers to the MBS data transmission from the relay node 710 to its subordinate relay node 720. The link 705 refers to the MBS data transmission from the relay node 720 is its subordinate mobile stations UE4, UE5.

Referring to FIG. 7B, the table 75 lists 8 possible combinations of the transmission patterns. The first transmission pattern is that at the first time point T1, the links 701, 702 are synchronously transmitted, at the second time point T2, the links 703, 704 are synchronously transmitted, and at the third time point T3, the link 705 is transmitted. The remaining 7 combinations of transmission patterns can be understood by referring to FIG. 7B and following the exemplary descriptions on the first transmission pattern.

The concept of the multi-hop MBS system can be further generalized to include more than 3 hop levels. Also, at each hop level of the multi-hop MBS system, the base station and the relay node(s) at the upper hop level in the hierarchy may decide to transmit the same MBS data (the duplicate or the redundancy) again or not, when the relay nodes at the lower hop level is determined or scheduled to transmit the MBS data. Furthermore, at each hop level of MBS data transmission over the relay network, network coding, fountain codes, or medium access control layer (MAC) encoding can be applied on the same MBS data (the duplicate or the redundancy). Alternatively, the network coding, fountain codes, or medium access control layer (MAC) encoding can be just applied on the original of MBS data, or applied on both the original of MBS data as well as the duplicate of MBS data. The concept of applying network coding, fountain coding, or medium access control (MAC) layer coding on either of the MBS data or the duplicate of the MBS data, or on both of the MBS data or the duplicate of the MBS data can also be used in the aforementioned first exemplary embodiment to fourth exemplary embodiment.

Moreover, the multi-hop MBS system can be configured as a single frequency network (SFN) or configured as two different SFN using ALIAS. In view of SFN, the MBS system with relay can be configured as a single SFN or two separate SFNs. The first and the second phase of MBS transmission can be configured as the same SFN or as separate SFNs.

The concept of configuring the multi-hop MBS system as two different SFN using ALIAS can be further described below. In general, the definition of SFN is that all broadcasting entity such as the base station and the relay nodes in the multi-hop MBS system broadcast the same content or physical signals at the same predetermined time point. However, in the multi-hop MBS system 70, the base station or the relay nodes at upper hop level may decide not to transmit the same MBS data when the relay nodes at lower hop level is determined to transmit/forward the received MBS data. Even when the base station or the relay nodes at upper hop level may decide to transmit the same MBS data along with the relay nodes at lower hop level, the ALIAS may be added into the MBS data which are broadcast from the base station or the relay nodes at upper hop level. Therefore, the broadcasting entities which broadcast the MBS data with the ALIAS can be deemed as a first SFN (with the ALIAS), while the relay nodes at the lower hop level which are determined to transmit/forward the received MBS data can be deemed as a second SFN.

When a relay node or relay nodes at the lower hop level are determined or scheduled to transmit the received MBS data, all broadcasting entities at upper hop level may decide to transmit or not to transmit the same MBS data (or the redundancy). For example, suppose there are two relay nodes at a first hop level in a multi-hop MBS system, the base station at the top of the hierarchy and the two base stations at the first hop level may decide transmit or not to transmit when the base station(s) at the second hop level are determined or scheduled to transmit the received MBS data.

In the present disclosure, the ALIAS provides information or a message indicating that there are two transmissions, and the MBAS data in both transmissions are identical. The ALIAS can be added in the MBS data which is transmitted for the first time or in the same MBS data which is transmitted for the second time. In other words, the ALIAS can be transmitted with the original MBS data, which is transmitted first. Alternatively, the ALIAS can be transmitted with the duplicate MBS data, which is transmitted after the original MBS data.

The ALIAS can just indicate that "this is the original" in the original MBS data, and leave the duplicate MBS data un-indicated. The ALIAS can just indicate that "this is the duplicate" in the duplicate MBS data, and leave the original MBS data un-indicated. Moreover, the ALIAS can be transmitted with both the original MBS data and the duplicate MBS data. That is, the ALIAS can be transmitted with both the original MBS data and the duplicate MBS data, and the ALIAS can respectively indicate that "this is the original" in the original MBS data, and indicate that "this is the duplicate" in the duplicate MBS data.

The ALIAS can be a packet header flag transmitted along with the MBS data packet. The ALIAS can be separate signal message transmitted along with the MBS data packet. The ALIAS can be a set of resource configuration which indicates that two transmissions are identical, or indicate that two transmissions are identical MBS data transmission. The ALIAS can be any kind of indicator, which shows the existence of redundancy or duplicate of the MBS data.

Figure 8A:
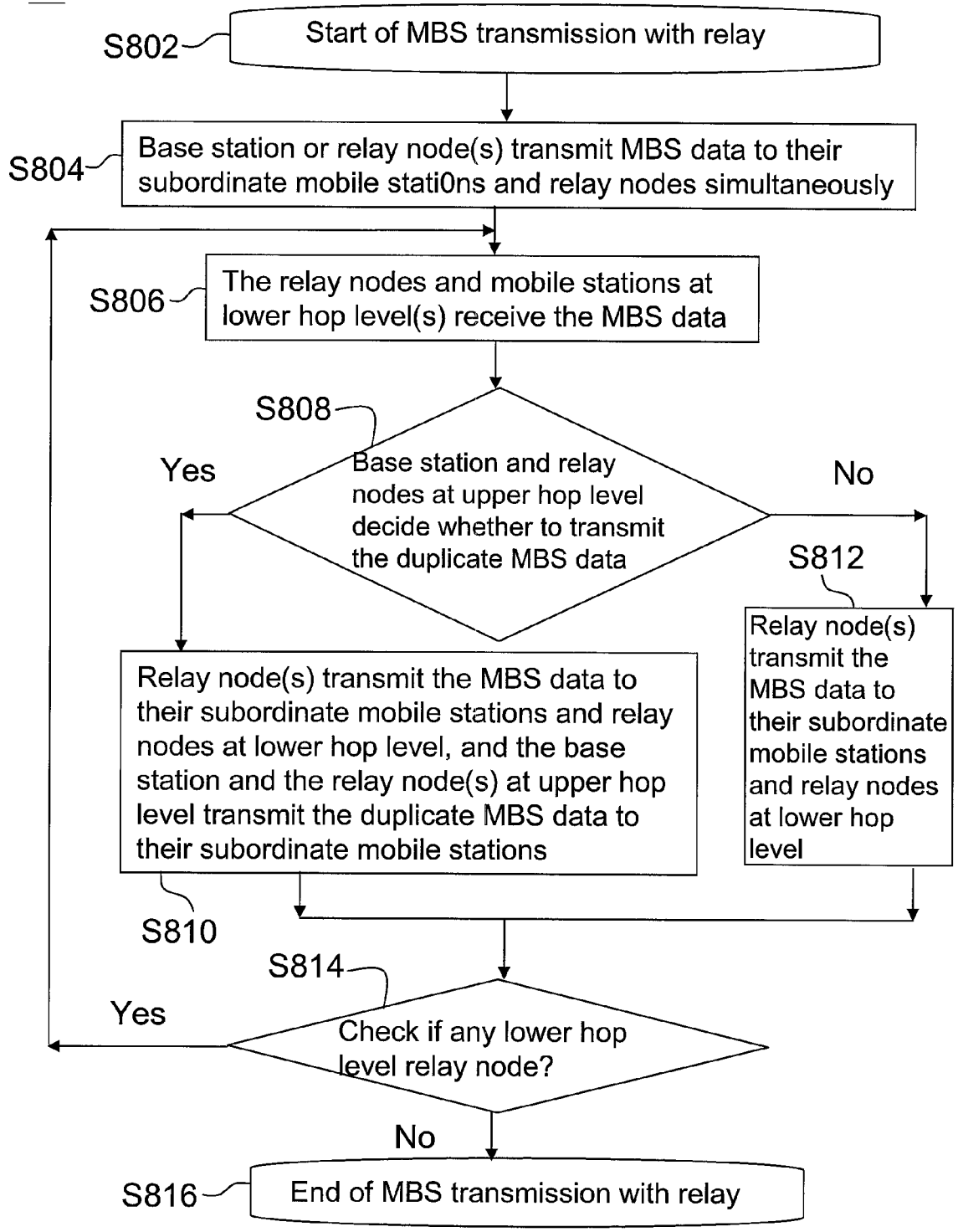
FIG. 8A is a flowchart illustrating a wireless transmission method according to an exemplary embodiment.

FIG. 8A is a flowchart illustrating a wireless transmission method 80 according to an exemplary embodiment. The wireless transmission method 80 is adapted for delivering MBS in a relay system (or under relay structure or in a relay network), such as in the MBS system 20 or the MBS system 70. The wireless transmission method 80 starts at step S802, where the MBS transmission with relay is started. At step S804, the base station or the relay node decides to transmit MBS data to its subordinate relay node(s) and mobile station(s) simultaneously, or the base station or the relay node decides not to transmit the MBS data along with its subordinate relay nodes or the relay nodes at lower hop level in the hierarchy.

It is assumed that in the wireless transmission method 80, the transmission order or transmission timing sequence of the base station or the relay node at each hop level are delivered to the base station and all of the relay nodes in advance, such that the base station and the relay nodes just deliver the MBS data at pre-determined time point. The transmission timing sequence can be implemented in a configuration table and delivered to all relay nodes as well as the mobile stations when they are registered in the network. Also, at the step S804, the base station and the relay nodes start MBS transmission.

At step S806, the mobiles stations and the relay nodes at lower hop level receive the MBS data. At step S808, the base station and the relay nodes at upper hop level decide whether to transmit the duplicate MBS data when the relay node(s) at the lower hop level are scheduled to transmit the received MBS data. If the decision is yes, then after the step S808, it is to execute step S810. That is, the base station and the relay nodes at upper hop level decide to transmit the duplicate MBS data. On the contrary, if the decision is no, then after the step 808, it is to execute step S812. That is, the base station and the relay nodes at upper hop level decide not to transmit the duplicate MBS data.

At the step S810, the relay node(s) transmit the MBS data to their subordinate mobile stations and relay nodes at lower hop level, and the base station and the relay node(s) at upper hop level transmit the duplicate MBS data to their subordinate mobile stations. The subordinate mobile stations of the transmitting relay nodes and relay nodes at further lower hop level in the step S810 may decide to receive the duplicate MBS data, decide to overhear the duplicate MBS data, or decide to abort the receiving procedure of the duplicate MBS data. For example, if the ALIAS is the packet header flag transmitted along with the MBS data packet, then any subordinate mobile station or any subordinate relay node may abort receiving procedure of the duplicate MBS data after the ALIAS of the duplicate MBS data is found.

At the step S812, the relay node(s) transmit the MBS data to their subordinate mobile stations and relay nodes at lower hop level. However, the base station and the relay node(s) at upper hop level do not transmit the duplicate MBS data.

At the step S814, it is to check whether there is any relay node at next lower hop level. If the check result is yes, which means there is a relay node at further lower hop level, then after the step S814, it is to execute step S806. If the check result is no, which means there is no further lower hop level, then after the step S814, it is to execute step S816. The wireless transmission method 80 is terminated at step S816, which is the end of the MBS transmission with relay.

The step S806 to the step S814 can be repeated for the relay node(s) at each hop level until the predetermined scheduled MBS transmissions at each one of the hop levels are executed.

In addition to transmit the same MBS data packets, the duplicate MBS data (or the redundancy) can be implemented using other encoding method. These methods include network coding, fountain codes, or other transmission coding techniques which can serve to encode the duplicate MBS data (or the redundancies). The original MBS data may be encoded, the duplicate MBS data (redundant data) may be encoded, or both the original MBS data and the duplicate MBS data may be encoded.

Figure 8B:
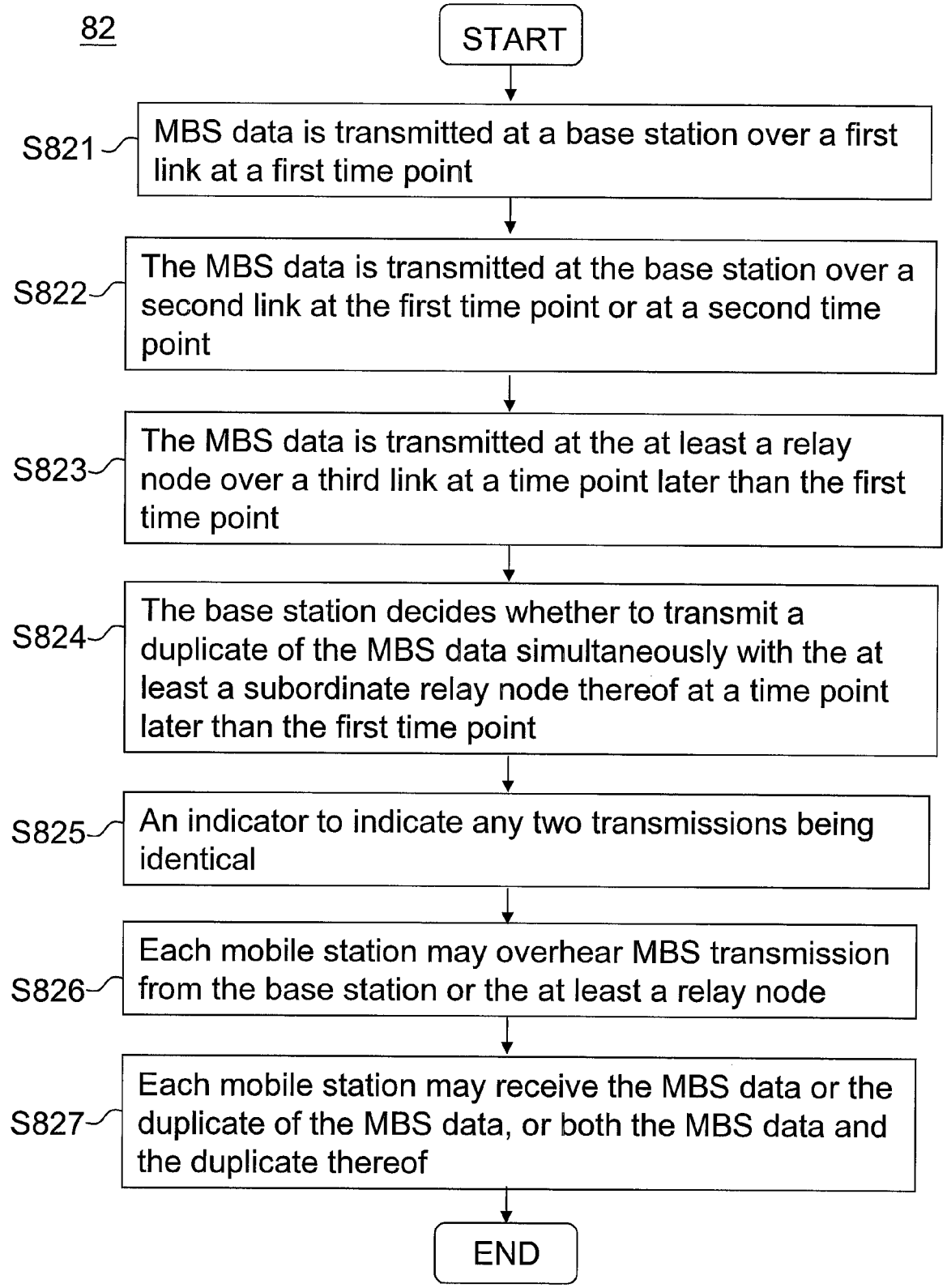
FIG. 8B is a flowchart illustrating another wireless transmission method according to an exemplary embodiment.

FIG. 8B is a flowchart illustrating another wireless transmission method 82 according to an exemplary embodiment. The wireless transmission method 82 includes the following steps, and starts at step S821. At the step S821, MBS data is transmitted at a base station (such as the base station BS in FIG. 2) over a first link at a first time point. At step S822, the MBS data is transmitted at the base station BS over a second link at the first time point or at a second time point. At step S823, the MBS data is transmitted at the at least a relay node (such as the relay node RN in FIG. 2) over a third link at a time point later than the first time point. At step S824, the base station BS decides whether to transmit a duplicate of the MBS data simultaneously with the at least a subordinate relay node thereof at a time point later than the first time point.

At step S825, an indicator is used by the base station BS or the at least a subordinate relay node of the base station BS to indicate any two transmissions being identical. At step S826, Each one of the mobile stations in the relay system may overhear MBS transmission from the base station or the at least a relay node. At step S827, Each one of the mobile stations may receive the MBS data or the duplicate of the MBS data, or both the MBS data and the duplicate thereof. The wireless transmission method 82 is terminated after the step S827.

Figure 8C:
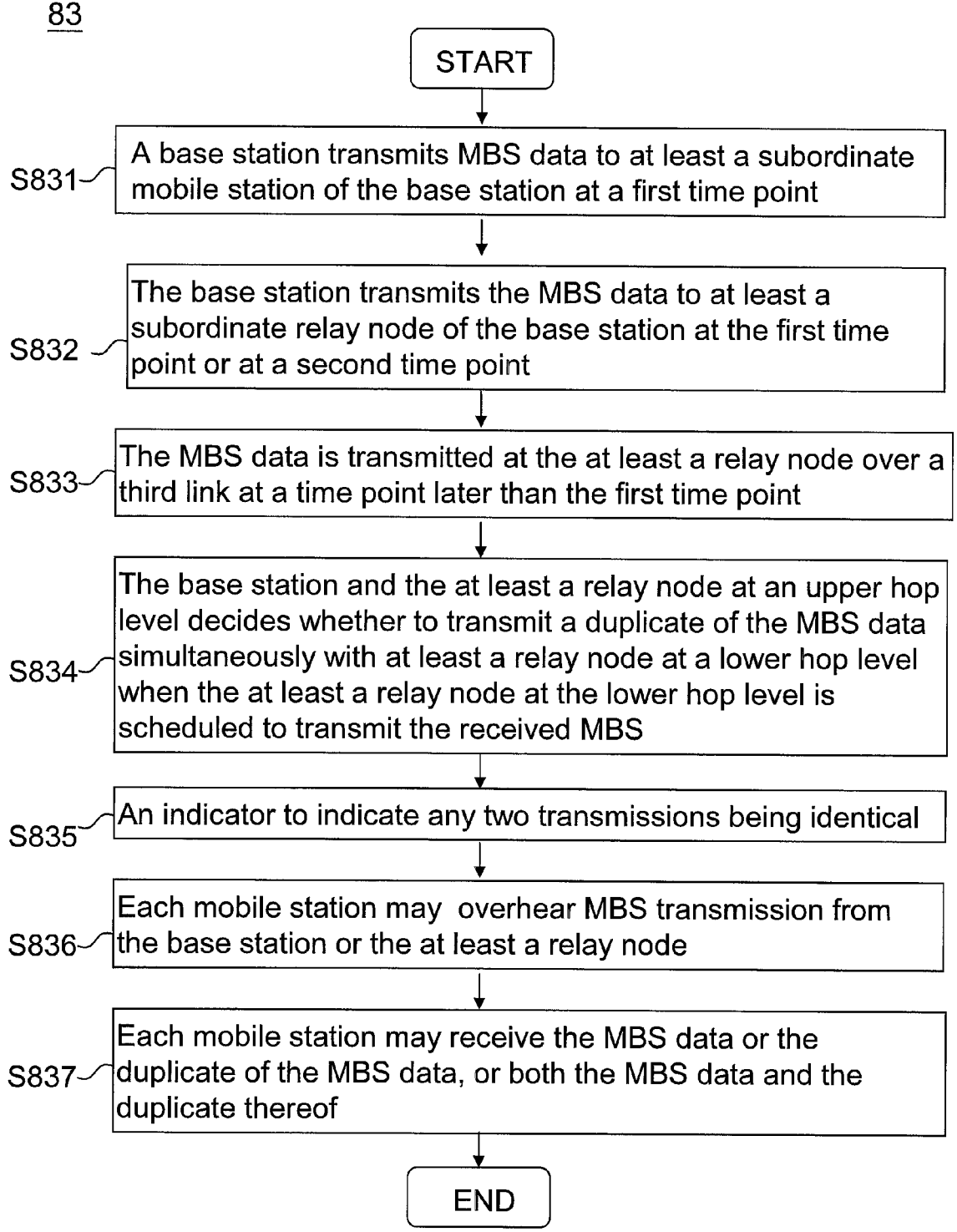
FIG. 8C is a flowchart illustrating another wireless transmission method according to an exemplary embodiment.

FIG. 8C is a flowchart illustrating another wireless transmission method 83 according to an exemplary embodiment. The wireless transmission method 83 includes the following steps, and starts at step S831. At the step S831, a base station (such as the base station BS in FIG. 7A) transmits MBS data to at least a subordinate mobile station of the base station at a first time point. At step S832, the base station BS transmits the MBS data to at least a subordinate relay node (such as the relay node 710 in FIG. 7A) of the base station BS at the first time point or at a second time point at the first time point or at a second time point. At step S833, the MBS data is transmitted at the at least a relay node 710 over a third link at a time point later than the first time point. At step S834, the base station BS and the at least a relay node 710 at an upper hop level decides whether to transmit a duplicate of the MBS data simultaneously with at least a relay node (such as the relay node 720) at a lower hop level when the at least a relay node 720 at the lower hop level is scheduled to transmit the received MBS.

At step S835, an indicator is used by the base station BS or the at least a subordinate relay node 710 of the base station BS to indicate any two transmissions being identical. At step S836, Each one of the mobile stations in the relay system may overhear MBS transmission from the base station or the at least a relay node. At step S837, Each one of the mobile stations may receive the MBS data or the duplicate of the MBS data, or both the MBS data and the duplicate thereof. The wireless transmission method 82 is terminated after the step S837.

Figure 8D:
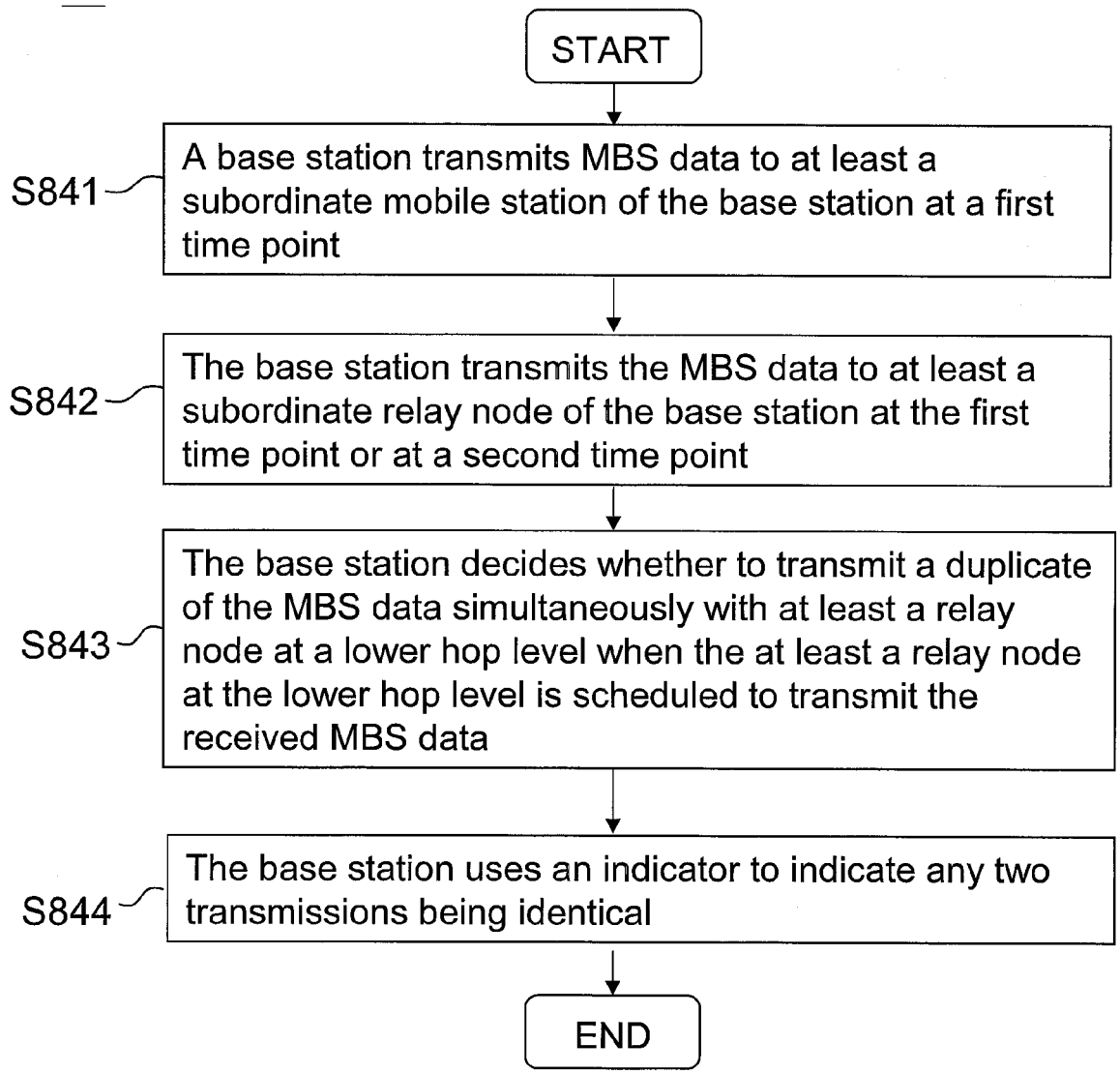
FIG. 8D is a flowchart illustrating an MBS delivery process of a base station according to an exemplary embodiment.

FIG. 8D is a flowchart illustrating an MBS delivery process 84 of a base station according to an exemplary embodiment. The MBS delivery process 84 is adapted for a base station (such as the base station BS in FIG. 7A) to deliver MBS in a relay system, and includes following procedures. At step S841, a base station BS transmits MBS data to at least a subordinate mobile station (such as the mobile station UE 1 in FIG. 7A) of the base station BS at a first time point. At step S842, the base station BS transmits the MBS data to at least a subordinate relay node (such as the relay node 710 in FIG. 7A) of the base station BS at the first time point or at a second time point.

At step S843, the base station BS decides whether to transmit a duplicate of the MBS data simultaneously with at least a relay node (such as the relay node 710 or the relay node 720 in FIG. 7A) at a lower hop level when the at least a relay node 710 at the lower hop level is scheduled to transmit the received MBS data. At step S844, the base station uses an indicator to indicate any two transmissions being identical. The MBS delivery process 84 of a base station is terminated after the step S844.

Figure 8E:
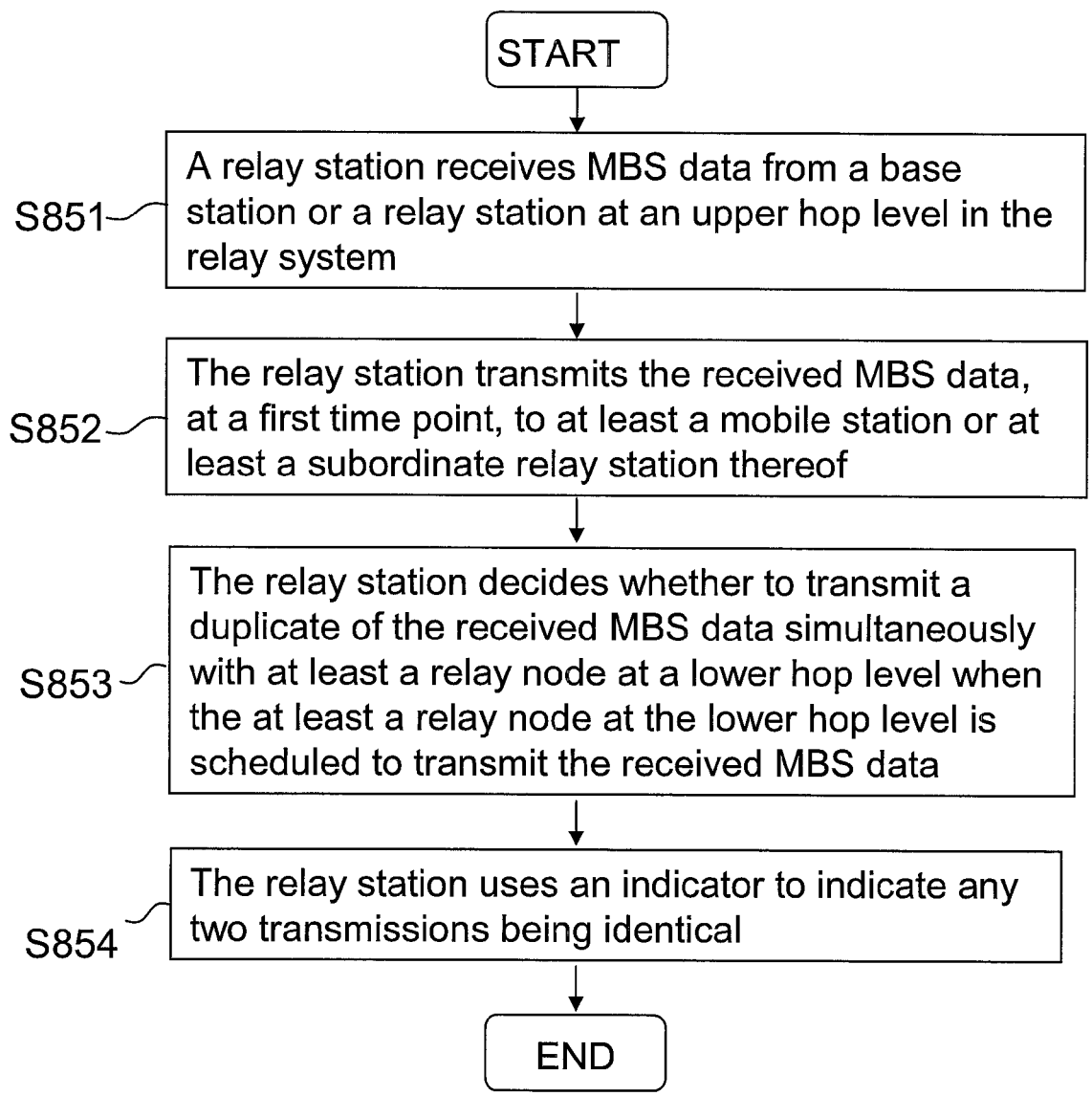
FIG. 8E is a flowchart illustrating an MBS delivery process of a relay station according to an exemplary embodiment.

FIG. 8E is a flowchart illustrating an MBS delivery process 85 of a relay station according to an exemplary embodiment. The MBS delivery process 85 of a relay station is adapted for a relay node (such as the relay node 710 in FIG. 7A) to deliver MBS in a relay system, and includes following procedures. At step S851, a relay station (or the relay node 710) receives MBS data from a base station or a relay station at an upper hop level in the relay system. At step S852, the relay station transmits the received MBS data, at a first time point, to at least a mobile station (such as the mobile station UE3 in FIG. 7A) or at least a subordinate relay station (such as the relay node 720 in FIG. 7A) thereof.

At step S853, the relay station decides whether to transmit a duplicate of the received MBS data simultaneously with at least a relay node (such as the relay node 720) at a lower hop level when the at least a relay node at the lower hop level is scheduled to transmit the received MBS data. At step S854, the relay station uses an indicator to indicate any two transmissions being identical. The MBS delivery process 85 of a relay station is terminated after the step S854.

Figure 8F:
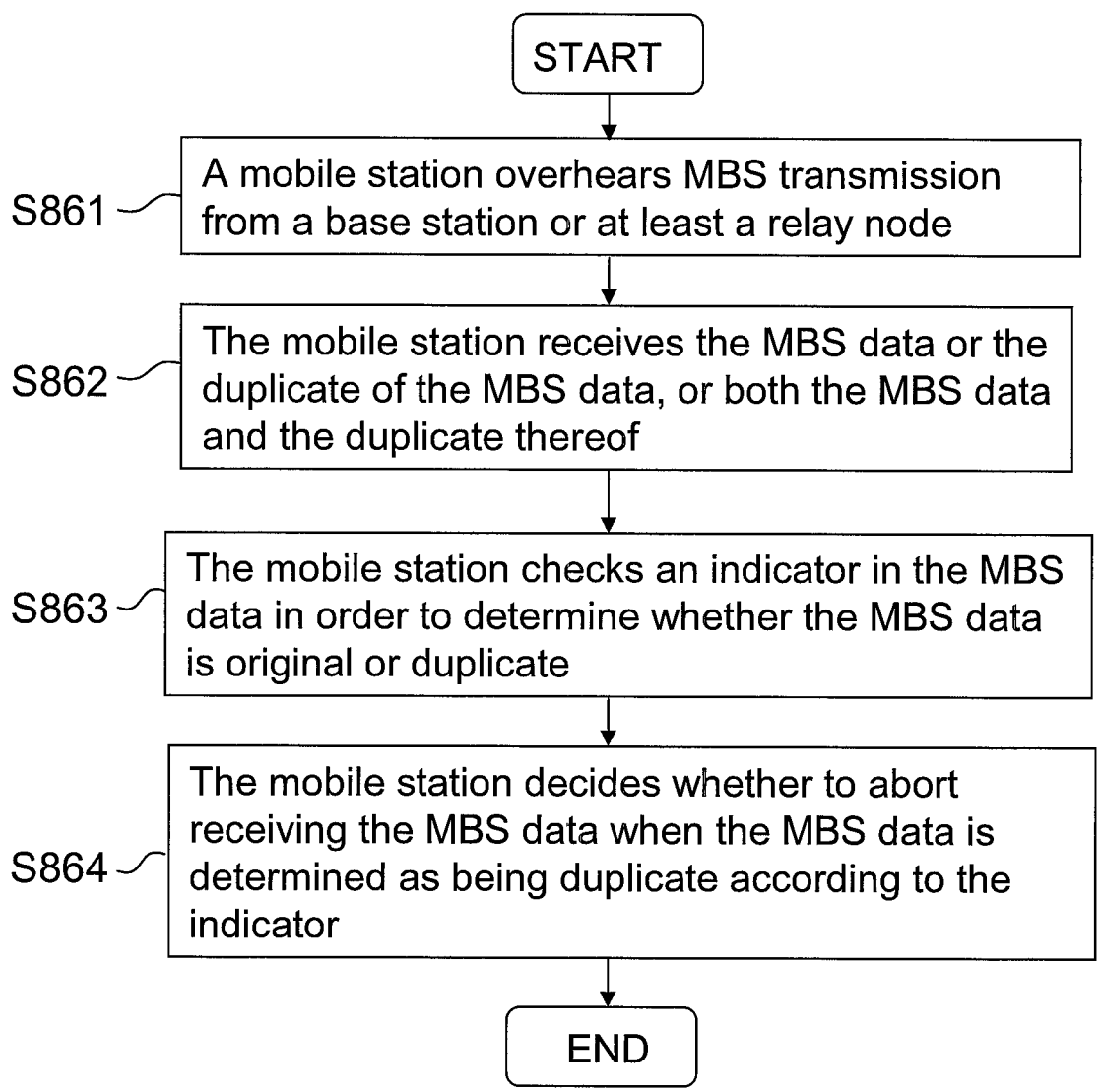
FIG. 8F is a flowchart illustrating an MBS receiving process of a mobile station according to an exemplary embodiment.

FIG. 8F is a flowchart illustrating an MBS receiving process 86 of a mobile station according to an exemplary embodiment. The MBS receiving process 86 of a mobile station is adapted for a mobile station (such as the mobile station UE3 in FIG. 7A) to receive MBS in a relay system, and includes following procedures. At step S861, a mobile station (or the mobile station UE3) overhears MBS transmission from a base station (such as the base station BS in FIG. 7A) or at least a relay node (such as the rely node 710). At step S862, the mobile station receives the MBS data or the duplicate of the MBS data, or both the MBS data and the duplicate thereof. At step S863, the mobile station checks an indicator in the MBS data in order to determine whether the MBS data is original or duplicate. At step S864, the mobile station decides whether to abort receiving the MBS data when the MBS data is determined as being duplicate according to the indicator. The MBS receiving process 86 of a mobile station is terminated after the step S864.

Figure 9:
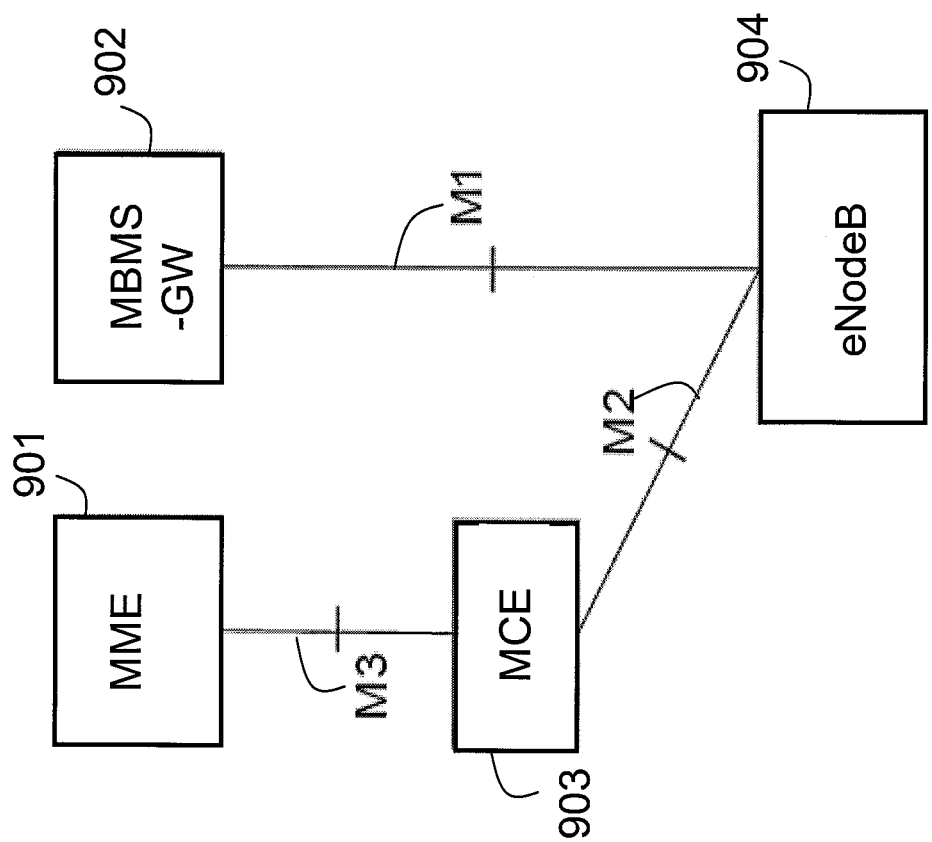
FIG. 9 is a schematic diagram illustrating a system structure of a multimedia broadcast multicast service system according to a sixth exemplary embodiment.

FIG. 9 is a schematic diagram illustrating a system structure of a multimedia broadcast multicast service system 90 according to a sixth exemplary embodiment. This is another embodiment of the present disclosure for implementing the MBS transmission with relay nodes (or the MBS transmission under the relay structure). The multimedia broadcast multicast service (MBMS) system 90 is defined in LTE systems. Referring to FIG. 9, the multimedia broadcast multicast service system 90 includes a mobility management entity (MME) 901, a MBMS gateway (MBMS-GW) 902, a Multicast Coordination Entity (MCE) 903, and an enhanced NodeB (eNodeB) 904. The MME 901 is connected with the MCE 903 through an M3 interface, the MBMS-GW 902 is connected with the eNodeB 904 through an M1 interface, and the MCE 903 is connected with the eNodeB 904 through an M2 interface.

For the MBMS system 90, the MME 901 is responsible for the MBMS session announcement and the MBMS session management. The MME 901 can announce start of the MBMS session and stop of the MBMS session. If it is necessary, the MME 901 also manages related MBMS parameters and related MBMS setting during MBMS operation. MCE 903 coordinates the multicast transmission over the single frequency network (SFN) by allocating the subframe allocations of the MBMS. MBMS-GW 902 is responsible for providing the data payload (MBMS packet) to the eNodeB for the MBMS transmission. The actual data packet transmitted during the MBMS operation is provided by MBMS-GW 902.

The eNodeB 904 is an enhanced version of base station in the LTE protocol. The eNodeB 904 is responsible for the actual MBMS packet transmission to the user equipments (UE) or mobile stations. The SFN is formed by the subframe allocation indicated from MCE 903, and MBMS data packets are from the MBMS-GW 902. At the subframe allocated, the eNodeB 904 transmits out the MBMS data through the air interface (wireless transmission) to the UEs or the mobile stations. As to the signaling of the MBMS in LTE system, FIG. 10 and FIG. 11 serve as a clear illustration for the system signals.

Figure 10:
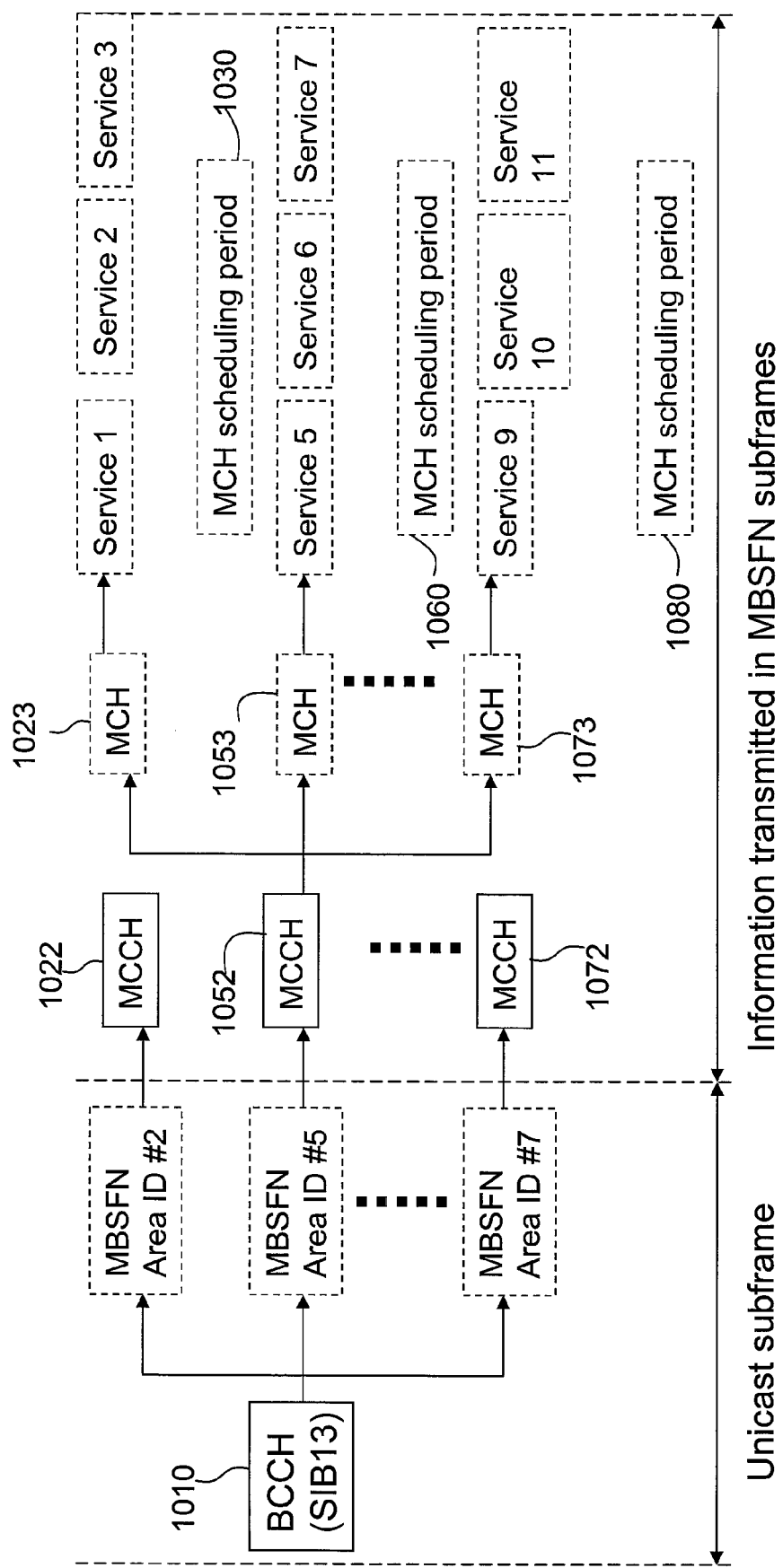
FIG. 10 is a schematic diagram illustrating an overall signal flow form an enhanced NodeB to mobile stations.

FIG. 10 illustrates an overall signal flow form an enhanced NodeB to mobile stations. The mobile stations or UEs receive broadcast control channel (BCCH) from the 13$^{th}$ system information block (SIB13) and obtain the multicast broadcast single frequency network (MBSFN) Area identifier (ID). After the mobile stations or the UEs obtain the MBSFN Area ID, related multicast control channel (MCCH) is gathered. The MCCH shows the position of each one of multicast channels (MCHs). This position information is stored in the Multicast Channel (PMCH)-InfoList of the MCCH. Therefore, the mobile stations or the UEs can find the desired MBMS application (or the MBMS data) from the MCH within the PHCH of the MCCH. The MCH indicates subframes for the MBMS data packets, and the mobile stations or the UEs may receive the specific MBMS data packet through the information provided in the MCH.

For example, referring to FIG. 10, the mobile stations or the UEs receive BCCH in unicast subframe. In particular, the mobile stations or the UEs receive the BCCH (SIB13) 1010, and obtains MBSFN Area ID #2, MBSFN Area ID #5, . . . , MBSFN Area ID #7 and so forth. From the information transmitted in MBSFN subframes, the mobile stations or the UEs may further obtain related MCCHs 1022, 1052, 1072 respectively associated with MBSFN Area ID #2, MBSFN Area ID #5, . . . , MBSFN Area ID #7. The mobile stations or the UEs then may find the MCHs 1023, 1053, . . . , 1073 within the PHCH of the MCCH 1052.

Moreover, the mobile stations or the UEs may respectively receive the MBMS data packets of services 1, 2, 3 through the information provided in the MCH 1023. Similarly, the mobile stations or the UEs may respectively receive the MBMS data packets of services 5, 6, 7 through the information provided in the MCH 1053. Also, the mobile stations or the UEs may respectively receive the MBMS data packets of services 9, 10, 11 through the information provided in the MCH 1073. There is a MCH scheduling period 1030 between the MCH 1023 and the MCH 1053, and a MCH scheduling period 1060 between the MCH 1053 and the MCH 1073. The MCH 1073 is followed by a MCH scheduling period 1080.

FIG. 11A-FIG. 11C are schematic diagrams illustrating relationship between SIB13, MCCH, and MCH. Referring to FIG. 11A, each rectangular block represents physical signal. Each physical signal indicates different level of MBMS information, and the mobile stations or the UEs find the desired MBMS data packet by seeking MCCH info from the SIB13, and locate the corresponding MCH from MCCH. For example, in FIG. 11A, the SIB 13 stores MBSFN information of MBSFN Area ID #1, MBSFN Area ID #2, and MBSFN Area ID #3. The SIB 13 respectively indicates the MCH for the MBSFN Area ID #1, the MBSFN Area ID #2, and the MBSFN Area ID #3.

Referring to FIG. 11B, after common subframe allocation, the subframes 1101, 1102, 1103, 1104, 1105, 1111, 1112 are all allocated in a first common subframe allocation period. The subframes 1201, 1202, 1203, 1204, 1205, 1211, 1212 are all allocated in a second common subframe allocation period. Referring to FIG. 11C, after the PMCH information is allocated, the subframes 1101, 1102, 1103, 1104, 1105 are allocated for the first phase of MBMS transmission, while the subframes 1111, 1112 are allocated for the second phase of MBMS transmission.

In the present disclosure, the MBS transmission method with relay is demonstrated. There are two different MBS transmission methods with relay proposed below. The ALIAS signaling can also be included in these two exemplary embodiments. The sixth exemplary embodiment proposes the first MBS transmission method with relay, which is "Separate signals from MBMS packets." In the sixth exemplary embodiment, the ALIAS is put in SIB13 or in the MCCH-PMCH. If the ALIAS is to be put in SIB13, the contents of the ALIAS may be in a format such as: MBSFN_AREA_ID #A=MBSFN_AREA_ID#B, where the MBMS data packet transmitted associated with the MBSFN_AREA_ID#A can be indicated by the ALIAS as being identical to the MBMS data packet transmitted associated with the MBSFN_AREA_ID #B.

In other words, the ALIAS indicates that there are two MBSFNs with the same MBMS data packet being distributed. This concept is similar to that illustrated in FIG. 3A-FIG. 3C. In the sixth exemplary embodiment, there are two phases of MBMS transmissions with relay. The first and second phase MBMS transmissions are deemed as two different SFNs, and the MBSFN Area IDs are respectively different for these two different SFNs. By sending the ALIAS in SIB13, the eNodeB 904, and the mobile stations and the UEs can know that these two SFNs are transmitted at different times with identical MBMS packet contents. Therefore, the function of ALIAS is achieved. In the first phase of MBMS transmission, the recipients of the first distinct SFN include the relay node RN, and the mobile stations UE1, UE2, UE3 and UE4 as shown in FIG. 3A. However, in the second phase of MBMS transmission, the recipients of the second distinct SFN include the mobile stations UE1, UE2, UE3 and UE4 as shown in FIG. 3B. It is noted that the overhearing is enabled in both the first phase and the second phase of the MBMS transmissions.

If the ALIAS is to be put in the MCCH-PMCH, the ALIAS may be of the form such as: MCCH-PMCH_Info: MBMS_SessionInfoList A=MCCH-PMCH_Info: MBMS_SessionInfoList B. In the current LTE system structure, the MBMS session info is stored in the MBMS_SessionInfoList. This MBMS_SessionInfoList is stored in the PMCH_Info, which resides in MCCH-PMCH. The MBMS_SessionInfo, stored in the MBMS_SessionInfoList, tells the mobile stations or the UEs which MCH contains specific MBMS data. As a result, the UEs may query the correct MCH for the actual physical subframe, and receive the MBMS data packets. Therefore, if the ALIAS is put in the MCCH-PMCH, the function of ALIAS can be achieved, using a different signaling scheme. The mobile stations or the UEs seek the MCCH-PMCH, and perceive that there are two identical MBMS sessions. Thus, the mobile stations or the UEs may listen to one or two times of MBMS transmission of the same MBMS data.

The seventh exemplary embodiment is the second MBS transmission method with relay. The seventh exemplary embodiment proposes MCE implementation, which uses sub-frame allocation indication. In the seventh exemplary embodiment, an upper level synchronization entity, such as the MCE 903 in FIG. 9, is used to indicate the ALIAS. The MCE 903 handles the subframe allocation and synchronization of the MBSFN, and signals the subframe allocation to the eNodeB 904 using the M2 interface. This is clearly illustrated in FIG. 9. The eNodeB 904 sends the corresponding SIB, MCCH, and MCH according to the indication of the MCE 903. Therefore, the MCE 903 actually controls the subframe allocation of the SFN for the MBMS.

Thus, the MCE 903 can be configured to provide the information that SFNConfigInfo_SubFrameAlloc #A=SFNConfigInfo_SubFrameAlloc #B, where SubFrameAlloc represents the subframe allocation. This SFNConfigInfo is a signaling message in the M2 interface. This SFNConfigInfo is sent from the MCE 903 to the eNodeB 904 to indicate the subframe allocation of the MBMS transmission. The eNodeB 904 receives the subframe allocation information, and encapsulate the subframe allocation information in the MCCH-PMCH and the MCH. In the seventh exemplary embodiment, the ALIAS indicates that the two sets of different subframe allocations actually contain the same MBMS data. Therefore, the mobile stations or the UEs receiving the ALIAS can know that they may receive the MBMS data from one set of subframe allocation or both sets of the subframe allocations.

FIG. 11D is a schematic diagram illustrating subframe allocation for two phase of MBMS data transmission. FIG. 11D clearly illustrates the seventh exemplary embodiment. The slots labelled with 1101, 1102, 11203, 1104, 1105 are the subframe allocation for the first-phase MBMS transmission of a subframe allocation phase $T_{sap}$, and the slots labelled with 1111, 1112 are for the second-phase MBMS transmission. Since the MCE 903 indicates that SubFrameAlloc #A=SubFrameAlloc #B, the mobile stations or the UEs can know that the slots respectively allocated for the first-phase MBMs transmission and for the second-phase MBMS transmission actually carry the same MBMS data. Therefore, UEs may listen to just the first phase of the MBMS transmission, just the second phase of the MBMS transmission, or both of the first phase and the second phase of the MBMS transmissions.

The present disclosure is not limited to the aforementioned sixth exemplary embodiment and the seventh exemplary embodiment, and the MBMS transmission techniques under the relay structure of the present disclosure can also be applied to multi-hop relay networks. For example, the MBMS transmission techniques under the relay structure of the present disclosure can be applied in a multi-hop MBMS system with a similar network structure to the multi-hop MBS system 70. In the multi-hop MBMS system, each hop level can be seen or configured as an independent SFN, therefore the overall multi-hop MBMS system can be seen as a combination of multiple SFNs when the MBMS transmission is performed at the base station, the relay nodes at each hop level, and their respective subordinate relay stations and mobile stations.

In summary, according to the exemplary embodiments of the disclosure, a wireless transmission method and wireless communication devices using the same method are proposed. The wireless transmission method is adapted for delivering MBS under relay structure (or in a relay system), and the wireless communication devices using the same method include a base station, at least a relay node, and at least a mobile station in the relay system. The base station and the relay node(s) at upper hop level may decide to transmit the duplicate MBS data along with the relay node(s) at lower hop level. The ALIAS indicator can be used in either one or both of two transmission opportunities, where the ALIAS indicate two transmissions carry identical MBS data. Accordingly, efficiency and data reliability of the MBS transmission over a relay network can be improved due to macro diversity and overhearing being allowed on the mobile stations.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless transmission method, adapted for delivering multicast broadcast service (MBS) in a relay system, comprising:
   transmitting MBS data, at a base station, to at least a subordinate mobile station of the base station at a first time point;
   transmitting the MBS data, at the base station, to at least a subordinate relay node of the base station at the first time point or at a second time point, which is later than the first time point;
   deciding, at the base station and the at least a relay node at an upper hop level, whether to transmit a duplicate of the MBS data simultaneously with at least a relay node at a lower hop level when the at least a relay node at the lower hop level is scheduled to
   transmit the received MBS data at a time point later than the first time point; and using an indicator to indicate any two transmission being identical;
   wherein each one of mobile stations in the relay system is allowed to overhear MBS transmission from the base station or the at least a relay node, which do not have direct control over the mobile station or the mobile stations which overhear wherein such overhearing opportunities may be deemed as redundancies.

2. The wireless transmission method according to claim 1, wherein the duplicate of the MBS data is transmitted by the base station simultaneously with the at least a subordinate relay node thereof at the second time point.

3. The wireless transmission method according to claim 1, wherein the duplicate of the MBS data is transmitted by the base station simultaneously with the at least a subordinate relay node thereof at a third time point, which is later than the second time point.

4. The wireless transmission method according to claim 1, wherein the method further comprising:

receiving, at each one of the mobile stations in the relay system, the MBS data or the duplicate of the MBS data, or both the MBS data and the duplicate thereof.

5. The wireless transmission method according to claim 1, wherein the indicator is transmitted along with the MBS data, or transmitted along with the duplicate of the MBS data, or transmitted along with both the MBS data and the duplicate thereof.

6. The wireless transmission method according to claim 1, wherein the indicator is a packet header flag, a separate signaling message, a resource configuration or shared wireless radio resource, which is used to indicate two transmission opportunities for the two transmissions, and indicate the two transmissions being identical.

7. The wireless transmission method according to claim 1, wherein either or both of the MBS data or the duplicate of the MBS data is applied with network coding, fountain coding, or medium access control (MAC) layer coding.

8. The wireless transmission method according to claim 1, wherein the indicator is configured to indicate the MBS data being original but leave the duplicate of the MBS data un-indicated, or the indicator is configured to indicate the duplicate of the MBS data being not original but leave the MBS data un-indicated, or the indicator is configured to both indicate the MBS data being original and indicate the duplicate of the MBS data being not original.

9. The wireless transmission method according to claim 1, wherein at least a first transmitting entity, which transmits the MBS data with the indicator, and recipients of the MBS data with the indicator are configured as a single frequency network (SFN).

10. The wireless transmission method according to claim 9, wherein at least a second transmitting entity, which transmits the MBS data without the indicator, and recipients of the MBS data without the indicator are configured as another SFN.

11. The wireless transmission method according to claim 1, wherein when there is just 1-hop level of the at least a relay node in the relay system, the method further comprising:
    transmitting the MBS data, at the at least a relay node of the relay system, over a third link at a time point later than the first time point, wherein the third link is from the at least a relay node to a subordinate mobile station of the at least a relay node of the base station.

12. The wireless transmission method according to claim 11, wherein the MBS data is transmitted over the third link at the second time point.

13. The wireless transmission method according to claim 11, wherein the MBS data is transmitted over the third link at the third time point, which is later than the second time point.

14. A base station, adapted for delivering multicast broadcast service (MBS) in a relay system, wherein,
    the base station is configured for transmitting MBS data to at least a subordinate mobile station of the base station at a first time point;
    the base station is configured for transmitting the MBS data to at least a subordinate relay node of the base station at the first time point or at a second time point, which is later than the first time point;
    the base station is configured for deciding whether to transmit a duplicate of the MBS data simultaneously with at least a relay node at a lower hop level when the at least a relay node at the lower hop level is scheduled to transmit the received MBS data at a time point later than the first time point; and
    the base station is configured for using an indicator to indicate any two transmissions being identical;
    wherein each one of mobile stations in the relay system is allowed to overhear MBS transmission from the base station or the at least a relay node, which do not have direct control over the mobile station or the mobile stations which overhear wherein such overhearing opportunities may be deemed as redundancies.

15. The base station according to claim 14, wherein the base station transmits the duplicate of the MBS data simultaneously with the at least a subordinate relay node thereof at the second time point.

16. The base station according to claim 14, wherein the base station transmits the duplicate of the MBS data simultaneously with the at least a subordinate relay node thereof at a third time point, which is later than the second time point.

17. The base station according to claim 14, wherein the indicator is transmitted along with the MBS data, or transmitted along with the duplicate of the MBS data, or transmitted along with both the MBS data and the duplicate thereof.

18. The base station according to claim 14, wherein the indicator is a packet header flag, a separate signaling message, a resource configuration or shared wireless radio resource, which is used to indicate two transmission opportunities for the two transmissions, and indicate the two transmissions being identical.

19. The base station according to claim 14, wherein the MBS data or the duplicate of the MBS data is applied with network coding, fountain coding, or medium access control (MAC) layer coding.

20. The base station according to claim 14, wherein the indicator is configured to indicate the MBS data being original but leave the duplicate of the MBS data un-indicated, or the indicator is configured to indicate the duplicate of the MBS data being not original but leave the MBS data un-indicated, or the indicator is configured to both indicate the MBS data being original and indicate the duplicate of the MBS data being not original.

21. A relay station adapted for delivering multicast broadcast service (MBS) in a relay system, wherein,
    the relay station is configured for receiving MBS data from a base station or a relay station at an upper hop level in the relay system;
    the relay station is configured for transmitting the received MBS data, at a first time point, to at least a mobile station or at least a subordinate relay station thereof in the relay system;
    the relay station is configured for deciding whether to transmit a duplicate of the received MBS data simultaneously with at least a relay node at a lower hop level when the at least a relay node at the lower hop level is scheduled to transmit the received MBS data; and
    the relay station is configured for using an indicator to indicate any two transmissions being identical;
    wherein each one of mobile stations in the relay system is allowed to overhear MBS transmission from the base station or the at least a relay node, which do not have direct control over the mobile station or the mobile stations which overhear wherein such overhearing opportunities may be deemed as redundancies.

22. The relay station according to claim 21, wherein the relay station transmits the duplicate of the received MBS data simultaneously with the at least at the lower hop level at a second time point, which is later than the first time point.

23. The relay station according to claim 21, wherein the indicator is transmitted along with the received MBS data, or transmitted along with the duplicate of the received MBS data, or transmitted along with both the received MBS data and the duplicate thereof.

24. The relay station according to claim 21, wherein the indicator is a packet header flag, a separate signaling message, a resource configuration or shared wireless radio resource, which is used to indicate two transmission opportunities for the two transmissions, and indicate the two transmissions being identical.

25. The relay station according to claim 21, wherein either or both of the received MBS data or the duplicate of the received MBS data is applied with network coding, fountain coding, or medium access control (MAC) layer coding.

26. The relay station according to claim 21, wherein the indicator is configured to indicate the received MBS data being original but leave the duplicate of the received MBS data un-indicated, or the indicator is configured to indicate the duplicate of the received MBS data being not original but leave the received MBS data un-indicated, or the indicator is configured to both indicate the received MBS data being original and indicate the duplicate of the received MBS data being not original.

* * * * *